(12) United States Patent
Terashita et al.

(10) Patent No.: US 8,704,412 B2
(45) Date of Patent: Apr. 22, 2014

(54) ROTARY ELECTRIC MACHINE

(75) Inventors: Shigeaki Terashita, Gumma (JP); Yoji Unoki, Gumma (JP)

(73) Assignee: Nidec Servo Corporation, Gumma (JP)

( * ) Notice: Subject to any disclaimer, the term of this patent is extended or adjusted under 35 U.S.C. 154(b) by 342 days.

(21) Appl. No.: 13/157,494

(22) Filed: Jun. 10, 2011

(65) Prior Publication Data

US 2011/0304225 A1    Dec. 15, 2011

(30) Foreign Application Priority Data

Jun. 11, 2010 (JP) ................................. 2010-134543
Jun. 16, 2010 (JP) ................................. 2010-136683
Jun. 21, 2010 (JP) ................................. 2010-140307
May 18, 2011 (JP) ................................. 2011-111499

(51) Int. Cl.
   *H02K 37/00*    (2006.01)
(52) U.S. Cl.
   USPC ........................................ 310/49.16; 310/89
(58) Field of Classification Search
   USPC ........................................ 310/49.01–49.55, 89
   See application file for complete search history.

(56) References Cited

U.S. PATENT DOCUMENTS

| | | | |
|---|---|---|---|
| 4,234,808 A * | 11/1980 | Geppert et al. ............ | 310/49.11 |
| 5,283,486 A | 2/1994 | Kobori | |
| 5,410,200 A | 4/1995 | Sakamoto et al. | |
| 6,670,732 B2 * | 12/2003 | Sakamoto .................. | 310/49.44 |
| 7,446,441 B2 * | 11/2008 | Enomoto et al. ........... | 310/49.46 |
| 8,138,641 B2 * | 3/2012 | Sakamoto et al. .......... | 310/49.44 |
| 2005/0067903 A1 * | 3/2005 | Enomoto et al. ............ | 310/49 R |
| 2008/0169731 A1 * | 7/2008 | Lin et al. .................... | 310/49 R |
| 2010/0133929 A1 * | 6/2010 | Sakamoto et al. .......... | 310/49.44 |

FOREIGN PATENT DOCUMENTS

CN    1102936 A    5/1995

* cited by examiner

*Primary Examiner* — Nguyen N Hanh
(74) *Attorney, Agent, or Firm* — Keating & Bennett, LLP

(57) ABSTRACT

A rotary electric machine includes a stator in which windings are arranged around a plurality of main poles of a stator core, and a hybrid type rotor arranged with an air gap between the stator and the rotor has a step angle for the rotor of about 4.09° and uses metal bearings for supporting a rotor shaft of the rotor. Setting of the step angle for the rotor to be about 4.09° can make a rotation angle of the rotor caused by excitation of the windings by an input pulse signal larger as compared with a typical motor having a step angle of about 1.8°. With this unique arrangement, the rotor can be rotated at higher speeds, increasing the motor efficiency. Therefore, the motor output at approximately the same level as that of a conventional motor can be obtained without keeping the air gap high precision. Due to this, even if inexpensive slide bearings, i.e., metal bearings to support the rotor, are used, the performance equal to or higher than that of the conventional motor can be ensured, resulting in a large cost reduction.

5 Claims, 22 Drawing Sheets

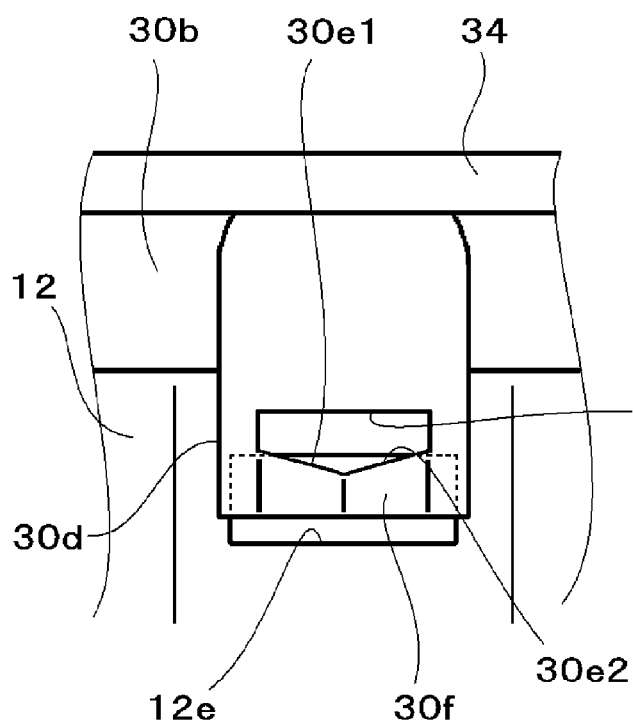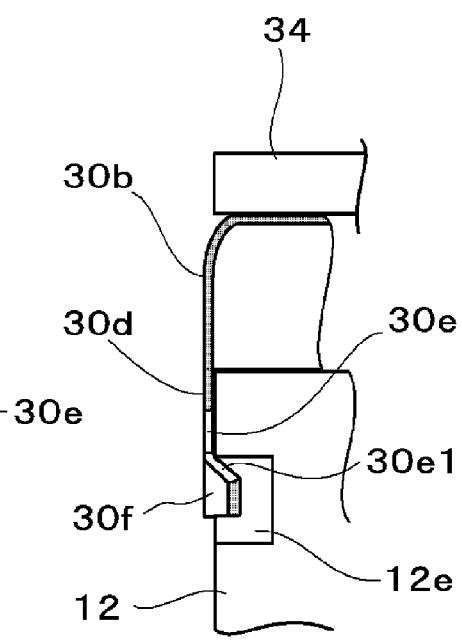
Fig.6 (a)　　　　　Fig.6 (b)

ROTARY ELECTRIC MACHINE

BACKGROUND OF THE INVENTION

1. Field of the Invention

The present invention relates to a rotary electric machine such as a stepper motor, which includes a stator including a plurality of main poles with windings arranged therearound and a rotor arranged inside the stator to be rotatable with respect to the stator.

2. Description of the Related Art

Stepping motors have been used as driving portions in a wide variety of areas including information equipment such as printers, facsimile machines, and copiers and industrial equipment such as FA instruments. The overall demand for stepper motors is growing every year and the applications of stepper motors are also expanding. In addition, demands for size reduction and cost reduction of stepper motors, which can contribute to the overall cost of equipment, are also increasing. Especially, the rotary electric machines such as stepper motors frequently used in OA instruments including copiers and facsimile machines are required to reduce the size and the cost, increase the rotation speed, provide a higher torque, and rotate with lower vibration.

In a case of a conventional hybrid type stepper motor using a magnetic material portion and a permanent magnet in a rotor, the structure disclosed in U.S. Pat. Nos. 5,283,486 and 5,410,200, for example, is frequently used. In these structures, a stator has a loop-like magnetic material frame with a plurality of main poles radially projecting inward and windings arranged around the respective main poles. The stator is arranged to oppose the hybrid type rotor in which the axially magnetized permanent magnet is interposed between a pair of magnetic material portions with an air gap.

Among the above described stepper motors, one having a step angle of 1.8° is frequently used. To keep and control that step angle with high precision, it is necessary to control the air gap between the stator and the rotor to 0.05 mm, for example. Thus, in the typical stepping motor having the step angle of 1.8°, a bush made of metal such as aluminum is fixed to a motor case supporting the stator and is arranged to hold a ball bearing, and the rotor shaft of the rotor is rotatably supported by the ball bearing with high precision.

However, in the above structure of the stepper motor, it is necessary to use the metal bush and the ball bearing in order to ensure a minute air gap between the stator and the rotor. This may increase the cost of the motor.

SUMMARY OF THE INVENTION

Preferred embodiments of the present invention provide a rotary electric machine such as, for example, a stepper motor, which can operate at high speeds with high efficiency.

According to a preferred embodiment of the present invention, a rotary electric machine includes a stator and a rotor which are arranged with an air gap therebetween such that the rotor is rotatable with respect to the stator. The stator includes: a stator core including an approximately loop-shaped core back portion and a plurality of main poles projecting radially inward from the core back portion; and two-phase windings arranged around the respective main poles of the stator core. Each main pole preferably has a plurality of teeth on its distal end. The rotor includes a rotor shaft and a rotor component supported by the rotor shaft. The rotor component includes a pair of rotor magnetic poles of magnetic material and an axially magnetized permanent magnet arranged between the rotor magnetic poles. Each rotor magnetic pole includes a plurality of magnetic teeth arranged equiangularly on its outer circumferential surface. The pair of rotor magnetic poles preferably is offset from each other by about ½ tooth pitch in a circumferential direction, for example. A step angle for the rotor is preferably set to about 4.09°, for example. A metal bearing is preferably used to support the rotor shaft of the rotor.

In the above-described rotary electric machine, it is preferable that covers are arranged on both sides of the stator in the axial direction and resin bearing holding members arranged to hold the metal bearings are attached to the covers. In this case, the bearing holding members respectively held by the covers can be provided by members having the same shape and disposed on both sides of the stator. Also, the metal bearings respectively held by the bearing holding members can be defined by members having the same shapes and provided on both sides of the stator. That is, common components having the same shape can be used.

As described above, setting of the step angle for the rotor to be about 4.09° can make a rotation angle of the rotor caused by excitation of the windings by an input pulse signal larger as compared with a typical motor having a step angle of about 1.8°. With this, the rotor can be rotated at higher speeds. The speeding up of the rotor causes an increase in the rotation frequency which results in an increase in the motor efficiency. On the other hand, the motor efficiency also depends on the size of the air gap between the stator and the rotor. That is, as the air gap becomes larger, the motor efficiency will become reduced. Considering this, even in a case where the air gap is large, the motor efficiency at approximately the same level as that obtained in a conventional motor can be ensured due to increase in the motor efficiency obtained by speeding up the rotor.

In other words, even if the air gap is not kept with high precision, the motor output at approximately the same level as that of the conventional motor can be obtained by speeding up the rotor. Therefore, an inexpensive slide bearing, i.e., a metal bearing can be used for supporting the rotor, thus reducing the cost greatly.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 6(a) and 6(b) are an enlarged front view and a cut side view of the portion shown in FIG. 5.

FIG. 17(a) is a partial front view seen from direction C in FIG. 15, and FIG. 17(b) is a cut side view of the portion shown in FIG. 17(a).

DETAILED DESCRIPTION OF THE PREFERRED EMBODIMENTS

Referring to FIGS. 1 through 23, the preferred embodiments of the present invention will now be described.

1. First Preferred Embodiment

Figure 1:
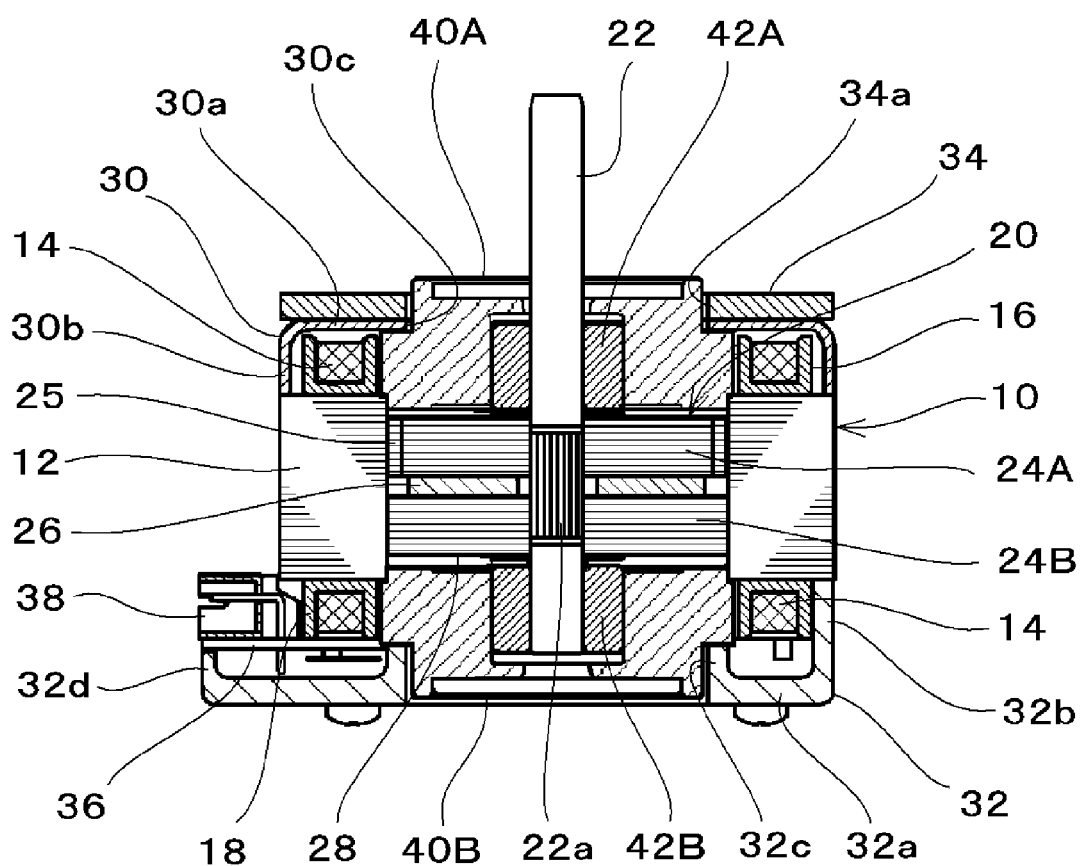
FIG. 1 is a cut front view of a two-phase hybrid rotary electric machine according to the first preferred embodiment of the present invention.
Figure 2:
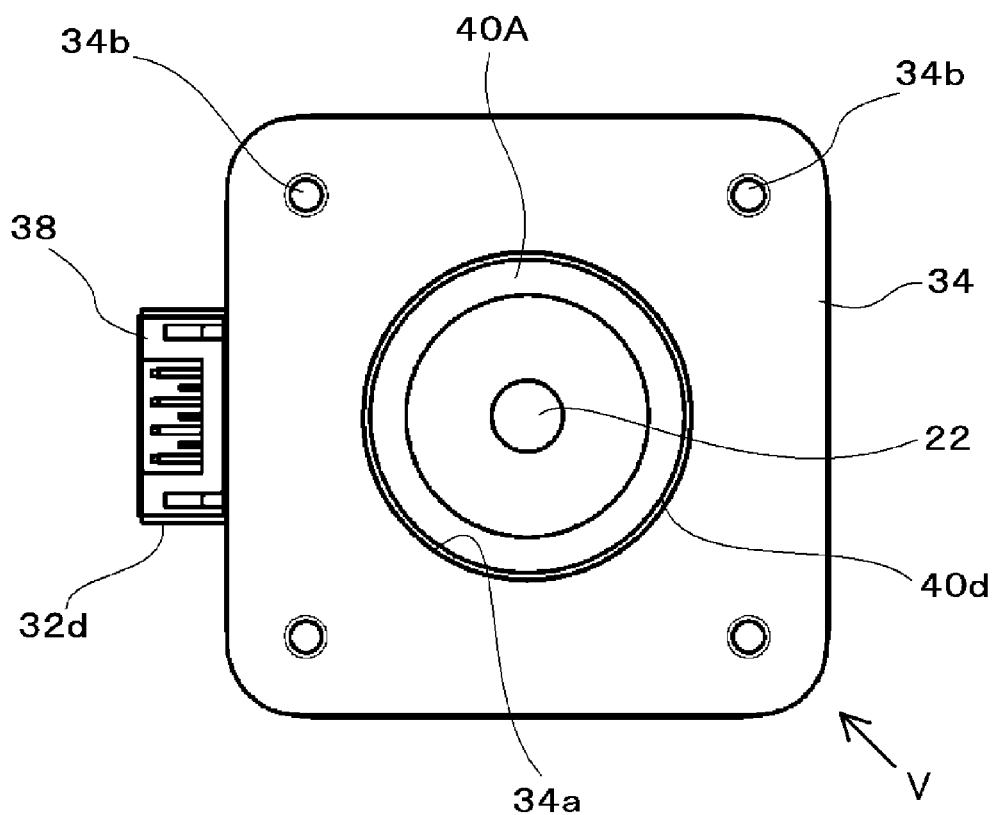
FIG. 2 is a plan view of the rotary electric machine of FIG. 1.
Figure 3:
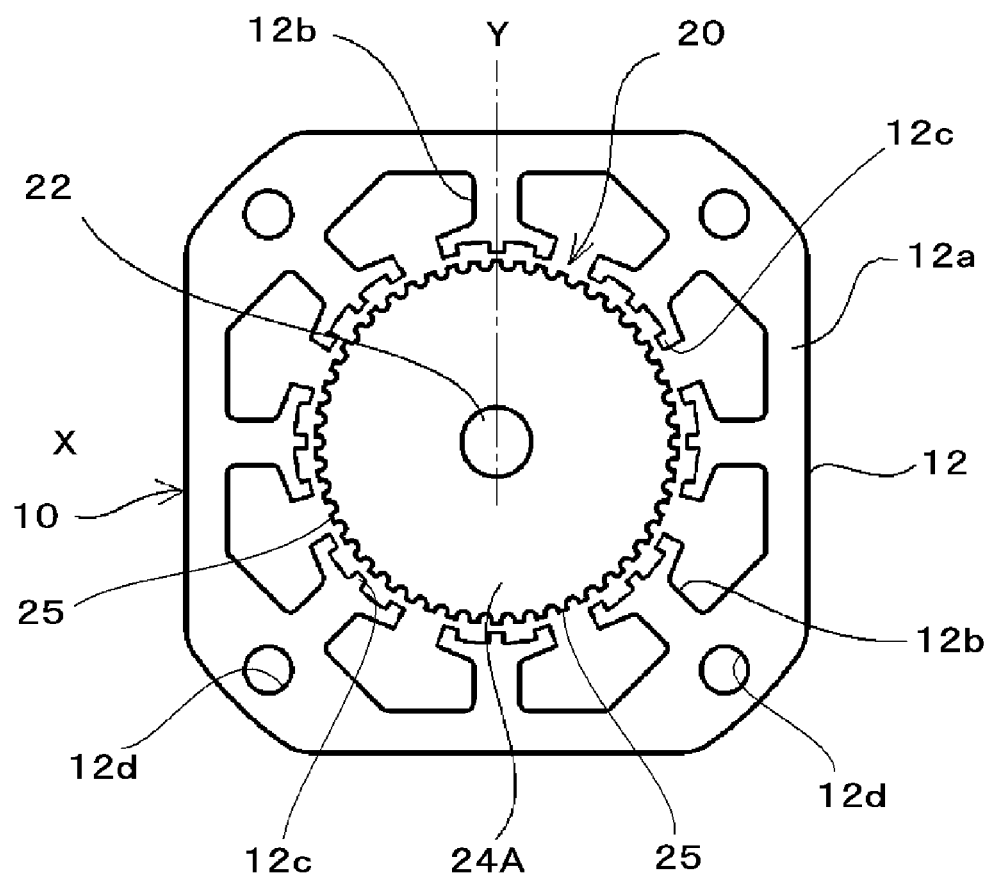
FIG. 3 is a plan view showing the positional relationship between a stator and a rotator in the rotary electric machine of FIG. 1.
Figure 4:
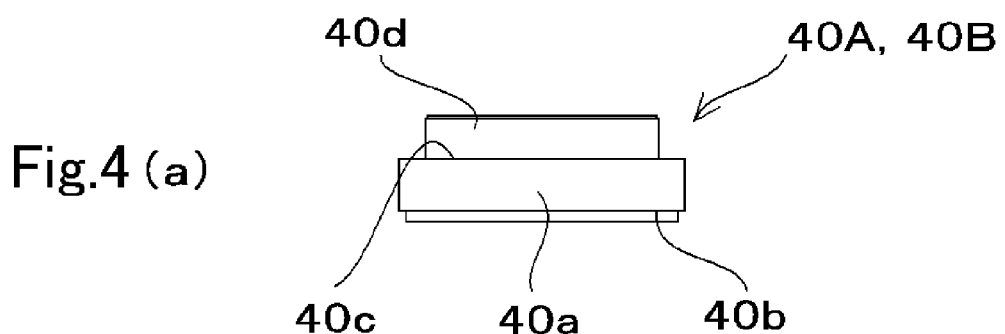
FIGS. 4(a) and 4(b) are front view and cut front view of a bearing bush in the rotary electric machine of FIG. 1.
Figure 4:
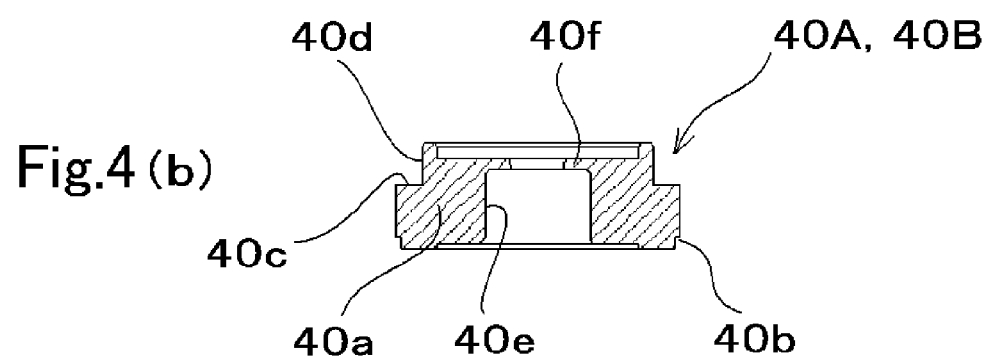

FIGS. 1 and 2 show the overall structure of a two-phase hybrid (HB) stepper motor according to the first preferred embodiment of the present invention. FIG. 1 is a cut front view and FIG. 2 is a plan view. FIG. 3 show the structure of a main portion of the stepper motor of this preferred embodiment in which a stator having 8 main poles and an HB type rotator are used in combination, seen in an axial direction. Windings are around neck portions of the main poles serving as winding poles, although the windings are not shown in FIG. 3. The windings on alternate main poles, i.e., on 4 main poles are connected to each other to define the winding for one phase, while the windings on other 4 alternate main poles define the other phase. In this manner, the windings for two phases are arranged in the HB stepper motor of this preferred embodiment. In this example, the stator adopts 8-main pole structure which does not cause an unbalanced electro-magnetic force and which has excellent high-speed performance.

The stator 10 preferably includes a stator core 12 having a core back portion 12a and 8 main poles 12b, two phases of windings 14 (shown in FIG. 1) wound around the main poles 12b, and upper and lower insulators 16 and 18 interposed between the main poles 12b and the windings 14. The core back portion 12a has a substantially squared loop-shaped contour. The 8 main poles 12b are arranged substantially equiangularly to radially project from the core back portion 12a inwardly. Each main pole 12b around which the windings are arranged preferably includes three teeth 12c on its distal end. The teeth 12c of each main pole 12b are preferably equally spaced and arranged symmetrically with respect to the center line of that main pole 12b.

The stator core 12 is preferably defined by a plurality of laminated silicon steel plates. As shown in FIG. 3, 4 main poles 12b on the horizontal axis (X-axis) and the vertical axis (Y-axis) intersecting at aright angle, i.e., 4 main poles 12c angularly spaced by 90° from each other are used for the first phase (Phases A and C), and the other 4 main poles 12b angularly spaced 90° from each other and each spaced from the adjacent first-phase main pole 12b by a mechanical angle of 45° are used for the second phase (Phases B and D). In each of the first and second phases, 4 main poles 12b spaced by 90° from each other are excited to have opposite polarities alternately when a current is supplied.

As shown in FIG. 1, the insulators 16 and 18 are preferably arranged to sandwich the stator core 12 from both sides in the axial direction and cover the neck portions of the main poles 12b around which the windings 14 are arranged. The windings 14 are wound around the respective main poles 12b with the insulators 16 and 18 interposed therebetween.

The rotor 20 arranged inside the stator core 12 preferably includes a pair of rotor magnetic poles 24A and 24B arranged axially adjacent to each other and fixed to the rotor shaft 22, and a disk-shaped permanent magnet 26 interposed between the rotor magnetic poles 24A and 24B and axially magnetized, as shown in FIG. 1. Each of the rotor magnetic poles 24A and 24B is preferably defined by a plurality of laminated silicon steel plates and has a plurality of teeth 25 on its outer circumference which are arranged substantially equiangularly. In this example, each magnetic pole 24A, 24B preferably includes 22 teeth. The pair of magnetic poles 24A and 24B are preferably offset by ½ tooth pitch with respect to each other such that the plurality of teeth 25 of magnetic pole 24A are not circumferentially aligned with the plurality of teeth 25 of magnetic pole 24B, and define a rotor portion 28 together with the permanent magnet 26 arranged between the rotor magnetic poles 24A and 24B. On a rotor shaft 22, a knurled portion 22a is preferably provided at an axial position corresponding to the location of the pair of magnetic poles 24A and 24B. When the rotor portion 28 is assembled, the rotor shaft 22 is press-fitted into the rotor magnetic poles 24A and 24B with the permanent magnet 26 interposed therebetween. The knurled portion 22a is arranged to prevent rotation of the magnetic poles 24A and 24B and to provide tight fixing. The permanent magnet 26 is preferably made of a ferrite magnet, for example, but can be made of other magnetic material, e.g., rare earth magnet such as Neodymium magnet.

In this example, the number of the teeth 25 on each rotor magnetic pole 24A, 24B is preferably 22. Thus, the tooth pitch of the teeth 25 is preferably about 360°/22=16.36°, and the step angle, obtained by dividing the tooth pitch of the teeth 25 by four, is about 4.09° because the stepper motor of this example is a two-phase motor. More specifically, as is apparent from the above, when one rotor magnetic pole 24A shown in FIG. 3 is magnetized to S-pole in the motor of HB type of this preferred embodiment, the tooth 25 of the other rotor magnetic pole 24B of N-pole is arranged between every adjacent two S-pole teeth 25 with a space corresponding to the thickness of the permanent magnet 26 in the axial direction. Therefore, the N-pole teeth pitch and the S-pole teeth pitch of the rotor portion 28 are about 8.18°, and the step angle obtained by dividing this value by the number of the phases is about 4.09° as described above because the number of the phases is preferably two in this preferred embodiment.

Referring to FIG. 1, covers 30 and 32 are arranged on both sides of the stator 10 in the axial direction. For the sake of convenience, the covers 30 and 32 are referred to as an upper cover 30 and a lower cover 32. The upper and lower covers 30 and 32 define a motor outer casing together with the outer surface of the stator core 12 of the stator 10. Each of the upper and lower covers 30 and 32 preferably have an approximately square shaped contour similar to the stator core 12. The lower cover 32 has a bottom plate 32a defining the bottom surface, a rectangular outer frame 32b, and an inner frame 32c coaxially arranged with the rotor shaft 22 and is preferably integrally molded of resin such as, for example, PPS or PBT. The lower cover 32 is preferably fixed to the stator 10 with the end surface of the outer frame 12 contact with the lower surface of the stator core 12. For example, the fixing is achieved by placing a portion of the lower insulator 18 and a portion of the lower cover 32 close to each other at a plurality of positions around the circumference and preferably applying ultrasonic waves to fix them by so-called ultrasonic adhesion or welding. The thus fixed lower cover 32 covers the insulator 18 and the windings 14 which project from the lower surface of the stator core 12.

A terminal portion to be used to permit electrical connection with the outside is provided on one side of the lower cover 32. More specifically, as shown in FIGS. 1 and 2, a portion of the outer frame 32b of the lower cover 32 is cut, and a support portion 32d is provided there by extending the bottom plate 32a to the side. A circuit board 36 is attached to the lower insulator 18 by using a binding pin fixed to the lower insulator 18. An end of the windings 14 is bound around and soldered to the pin, thereby being electrically connected to the circuit board 36. A portion of the circuit board 36 is preferably arranged to project from the outer side surface of the stator core 12 and is supported by the support portion 32d. Onto this portion of the circuit board 36, a connector 38 is attached. Therefore, power supply to the windings 14 and control of the windings 14 can be achieved by supplying a power from an external power source and signals via the connector 38.

The upper cover 30 is preferably formed by, for example, pressing a thin metal plate, and has a top plate 30a and a rectangular outer frame 30b. At the center of the top plate 30a, an opening 30c is provided to have the inner diameter approximately equal to the inner diameter of the inner frame 32c of the lower cover 32. The upper cover 30 is preferably fixed and bonded to the stator 10 by, for example, crimping, which is described later, while the lower end surface of the outer frame 30b is in contact with the upper surface of the stator core 12. Onto the upper surface of the top plate 30a, an attachment plate 34 is fixed thereto by spot welding, for example. The attachment plate 34 has approximately the same outer shape as the top plate 30a and is formed by punching a metal plate with press. The attachment plate 34 also has an opening 34a at its center which is coincident with the opening 30c of the top plate 30a.

As is apparent from FIG. 3, an axially extending hole 12d is provided at every corner of the stator core 12. The four holes 12d are preferably arranged at rotationally symmetrical locations with respect to the rotation axis of the motor, i.e., spaced from each other by about 90°. The upper and lower covers 30 and 32 on the upper and lower sides of the stator core 12 have through holes respectively corresponding to the above holes 12d, and the attachment plate 34 has screw holes 34b respectively corresponding to those through holes. When the motor is attached to another device, bolts which are inserted into the holes 12d and the through holes are screwed with the screw holes 34b of the attachment plate 34.

Bearing bushes 40A and 40B are preferably attached to the inner circumferential portion of the stator core 12 on both axial sides of the stator core 12. The bearing bushes 40A and 40B respectively hold metal bearings 42A and 42B which are arranged to support the rotor shaft 22 in a rotatable manner. The bearing bushes 40A and 40B have the same shape as each other and are preferably molded from resin such as, for example, PPS. FIGS. 4(a) and 4(b) show an exemplary shape of the bearing bushes 40A and 40B. In the bearing bush 40A, a stepped fitted portion 40b is provided under a main body 40a which is molded to have an annular shape. The fitted portion 40b is arranged to have the outer diameter approximately equal to the inner diameter of the teeth 12c of the main poles 12b of the stator core 12. On the end surface of the main body 40a, a cover support surface 40c is arranged in the outer peripheral region and a spigot portion 40d projecting axially outward is provided inside the cover support surface 40c. Moreover, a bearing holding surface 40e is defined on the inner circumference of the main body 40a, and a cover portion 40f is provided on the spigot portion 40d side of the bearing holding surface 40e to extend in the radial inward direction. The outer circumferential surface of the fitted portion 40b, the outer circumferential surface of the spigot portion 40d, and the bearing holding surface 40e are arranged coaxially or substantially coaxially.

The metal bearings 42A and 42B are preferably press-fitted to be fixed to the inside of the bearing holding surfaces 40e of the bearing bushes 40A and 40B, respectively. The bearing bushes 40A and 40B are attached to the stator core 12 from the both axial sides of the stator core 12, while the fitted portions 40b thereof facing each other. More specifically, the fitted portion 40b of each of the bearing bushes 40A and 40B is fitted to the inside of the inner side surface of the teeth 12c of the main poles 12b of the stator core 12, and the step of each fitted portion 40b is in contact with the end surface of the stator core 12. Thus, the center adjustment of the bearing bushes 40A and 40B with respect to the stator core 12 is achieved by the fitted surface (outer circumferential surface) of the fitted portion 40b, and the axial positions of the bearing bushes 40A and 40B in the axial direction are retained by the steps of the fitted portions 40b. The metal bearings 42A and 42B are preferably defined by oil-impregnated sleeves in which sintered porous metal is impregnated with lubricating oil, for example.

The lower bearing bush 40B is preferably fixed at the same time as fixing of the lower cover 32 to the stator core 12. More specifically, when the bearing bush 40B is attached to the stator core 12 with its fitted portion 40b fitted to the inside of the main poles 12b of the stator core 12, the main body 40a is held while being fitted to the inside of the inner circumferential surface of the lower insulator 18. In this state, the lower cover 32 is placed below the stator 10. Then, when the upper end surface of the outer frame 32b of the lower cover 32 is brought into contact with the lower surface of the stator core 12, the upper end surface of the inner frame 32c of the lower cover 32 comes into contact with the cover support surface 40c of the bearing bush 40B. The thus placed lower cover 32 is fixed to the insulator 18 by ultrasonic adhesion or ultrasonic welding, thereby the bearing bush 40B which is fitted into and held by the stator core 12 is sandwiched between the stator core 12 and the lower cover 32 and is therefore firmly fixed. The spigot portion 40d of the lower bearing bush 40B is freely fitted into the inner frame 32c of the lower cover 32. The end of the spigot portion 40d does not project from the lower cover 32 but is accommodated in the inner frame 32c.

The upper bearing bush 40A is attached to the stator core 12 after the rotor 20 is assembled with the rotor 10, and is fixed simultaneously by fixing the upper cover 30 to the stator 10. More specifically, the rotor 20 is inserted from above to the inside of the stator core 12 of the stator 10 to which the lower bearing bush 40B and the lower cover 32 are fixed; the lower portion of the rotor shaft 22 of the rotor 20 is inserted into the metal bearing 42B held by the bearing bush 40B; and the rotor magnetic poles 24A and 24B of the rotor 20 are arranged to oppose the inner surface of the main poles 12b of the stator core 12. Then, the bearing bush 40A holding the metal bearing 42A is mounted to the rotor shaft 22 with the fitted portion 40b of the bearing bush 40A facing downward, such that the rotor shaft 22 is inserted from its upper end into the metal bearing 42A, and then the fitted portion 40b is fitted to the inside of the main poles 12b of the stator core 12. After the fitted portion 40b of the bearing bush 40A is fitted into the stator core 12, the upper cover 30 is fixed to the stator core 12.

When the upper cover 30 is fixed to the stator core 12, the lower end surface of the outer frame 30b of the upper cover 30 is brought into contact with the upper surface of the stator core 12 and the top plate 30a of the upper cover 30 comes into contact with the cover support surface 40c of the bearing bush 40A simultaneously. Therefore, the bearing bush 40A is sandwiched between the stator core 12 and the upper cover 30, thereby being firmly fixed. In this state, the spigot portion 40d of the bearing bush 40A is freely inserted into the opening 30c of the top plate 30a of the upper cover 30 and the opening 34a of the attachment plate 34, as shown in FIG. 1, and the upper end portion of the spigot portion 40d projects from the upper surface of the attachment plate 34. With the use of this projecting portion of the spigot portion 40d, the rotor shaft 22 can be matched with an input portion of another device precisely when the motor of this preferred embodiment is mounted to that device.

Figure 5:
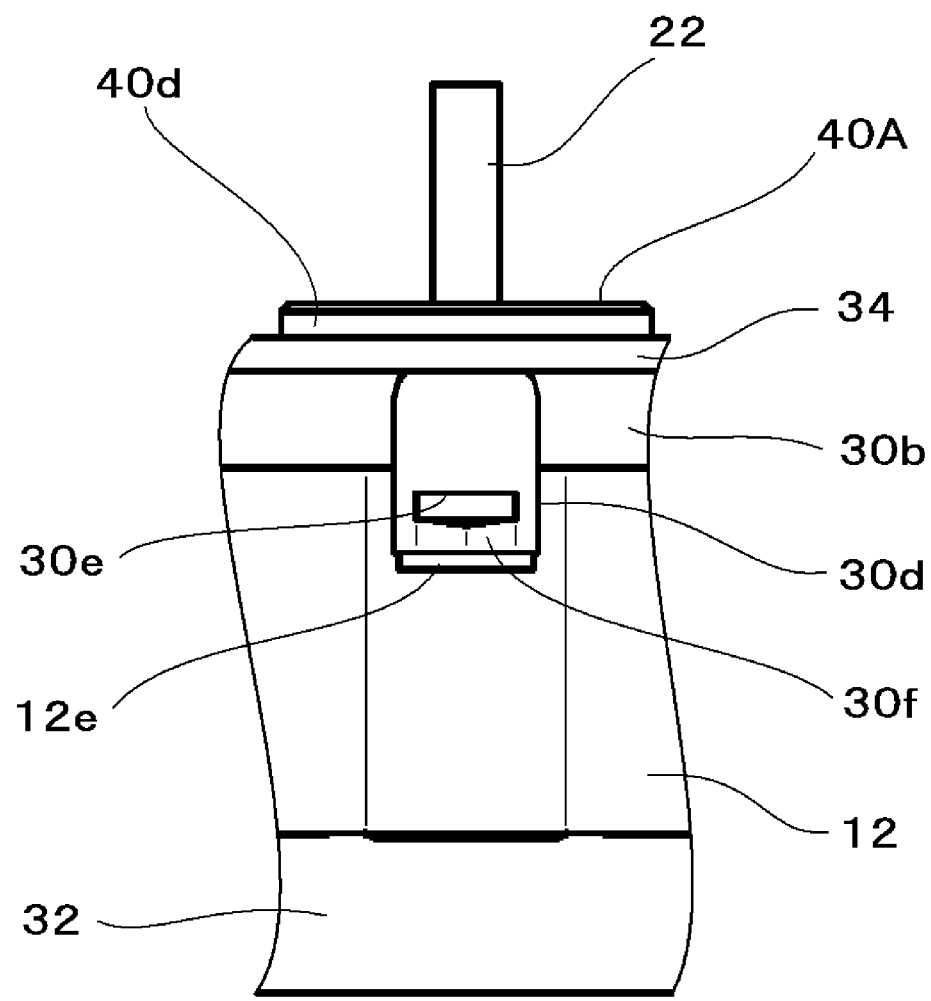
FIG. 5 is a partial front view of the rotary electric machine according to the first preferred embodiment of the present invention, seen in direction V in FIG. 2.

The fixing of the upper cover 30 to the stator 10 is described below. As described above, the rectangular upper cover 30 includes the top plate 30a and the outer frame 30b. In the outer frame 30b, a fixing piece 30d shown in FIG. 5 is preferably provided at a portion corresponding to every corner of the rectangle. The fixing piece 30d is provided integrally with other portions of the outer frame 30b and extends downward. The fixing piece 30d has a hole 30e in a lower portion, as shown in FIG. 6(a), and a portion of the fixing piece 30d lower than the hole 30e defines a crimping portion 30f. The hole 30e has two tapered surfaces 30e1 and 30e2 at the inner lower edge such that the center of the inner lower edge of the hole 30e is the lowest. On the stator core 12, a concave portion 12e corresponding to the lower portion of the fixing piece 30d is provided. The concave portion 12e has a rectangular opening on the outer surface of the stator core 12. The upper edge of the concave portion 12e is arranged to partially cross the tapered surfaces 30e1 and 30e2 of the hall 30e of the fixing piece 30d when the lower end surface of the outer frame 30b of the upper cover 30 is in contact with the upper surface of the stator core 12.

The upper cover 30 is fixed to the stator 10 as follows. After the upper bearing bush 40A is attached to the stator 10 as described above, the upper cover 30 is arranged on the stator 10 with the lower end surface of the outer frame 30b contact with the upper end surface of the stator core 12. Then, stamping is performed at the center of the crimping portion 30f of the fixing piece 30d located at every corner of the rectangle upper cover 30 from the outside toward the inside so that a portion of the crimping portion 30f is deformed to enter the concave portion 12e. In this manner, the upper cover 30 is fixed by crimping.

The entry of the crimping portion 30f of the fixing piece 30d to the concave portion 12e of the stator core 12 provides a retaining function for the upper cover 30d, i.e., prevents the upper cover 30 from falling off. In addition, the arrangement of this preferred embodiment can particularly fix the upper cover 30 more tightly. More specifically, as is apparent from FIGS. 6 (a) and 6 (b), the tapered surfaces 30e1 and 30e2 at the lower edge of the hole 30e of the fixing piece 30d, i.e., the upper-edge tapered surface of the crimping portion 30f are arranged to cross the upper edge of the concave portion 12e of the stator core 12. Therefore, when the crimping portion 30f is deformed toward the inside of the concave portion 12e, a downward tension is generated in the fixing piece 30d as the upper-edge tapered surfaces of the crimping portion 30f enter the concave portion 12e inwardly. Thus, the upper cover 30 can be pressed toward the stator core 12. This pressing force acts at the every corner of the upper cover 30, thereby tightly fixing the whole upper cover 30 onto the stator core 12.

In the stepper motor having the above arrangement, the step angle, i.e., an angle of revolution caused by a pulse signal is preferably set to, for example, about 4.09°, which is larger than a step angle of 1.8° for a typical stepper motor. The large step angle enables high-speed rotation. In other words, the stepper motor of this preferred embodiment has a structure which can operate at higher speeds. As the output of the motor is proportional to the product of the rotation frequency and the torque, this increase in the rotation speed can increase the output, resulting in increase in the motor efficiency.

Meanwhile the stepper motor of this preferred embodiment uses the metal bearings 42A and 42B as the bearings in the rotor 20, unlike conventional stepper motors. As the metal bearings 42A and 42B are so-called sliding bearings, an air gap between the stator and the rotor must be set to be slightly larger than in a motor using ball bearings. In this case, the air gap between the stator and the rotor affects the motor efficiency. More specifically, as the air gap is larger, the motor efficiency tends to be lowered. In this preferred embodiment, however, the rotation speed and the motor efficiency are increased by setting of the step angle, as described above. Therefore, even if the use of the metal bearings 42A and 42B results in a reduction in motor efficiency, the increase in the motor efficiency caused by increasing rotation speed can compensate that reduction can be obtained in this preferred embodiment. Thus, the stepper motor of the preferred embodiments of the present invention provides motor efficiency equal to or larger than that of conventional stepper motors even though the stepper motor of the preferred embodiments of the present invention include metal bearings 42A and 42B.

The stator core 12 is preferably provided by laminating a predetermined number of silicon steel plates in this preferred embodiment. In the process of forming the stator core 12, the silicon steel plates can be punched out by, for example, pressing in a predetermined shape and then can be stacked while being rotated by 90° from the adjacent one. This forming technique of the stator core 12 which includes rotations of 90° provides a benefit of suppressing variations in permeance vectors. More specifically, as the stator core 12 shown in FIG. 3 has 90° rotational symmetry, lamination of the silicon steel plates which are rotated by 90° from the adjacent one can cancel variations in the permeance vectors caused by variations in the dimension of the press die and the thickness of the silicon steel plates.

2. Other Preferred Embodiments

Next, other preferred embodiments of the present invention will be described.

Figure 7:
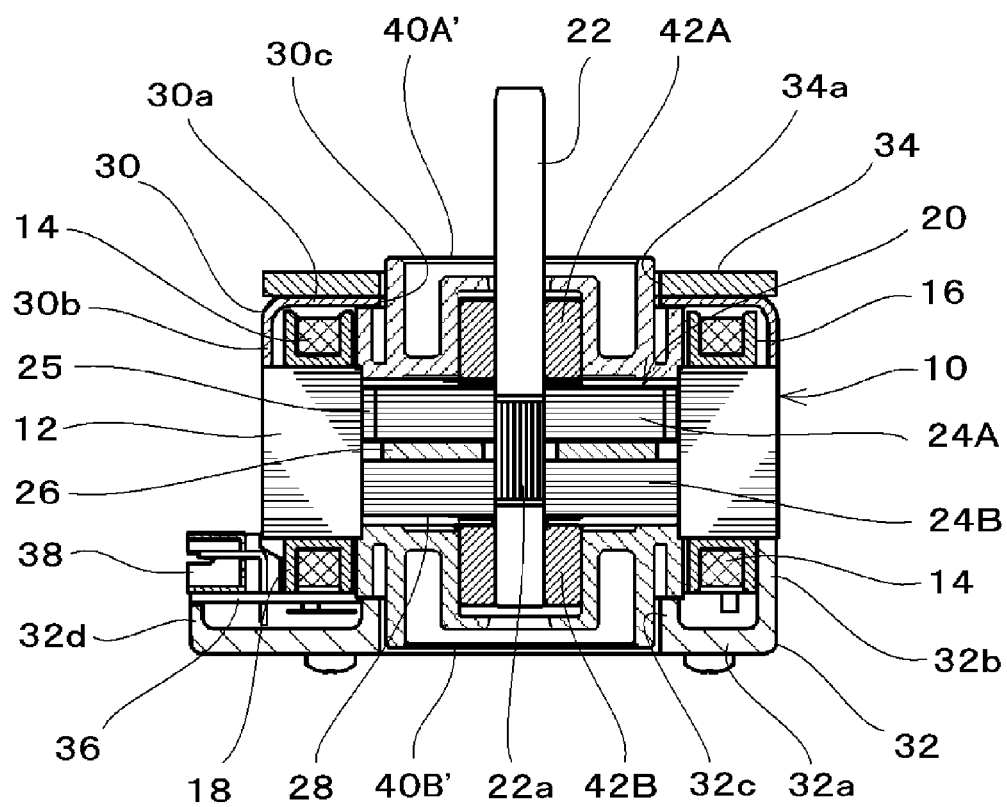
FIG. 7 is a cut front view of a rotary electric machine according to the second preferred embodiment of the present invention.
Figure 8:
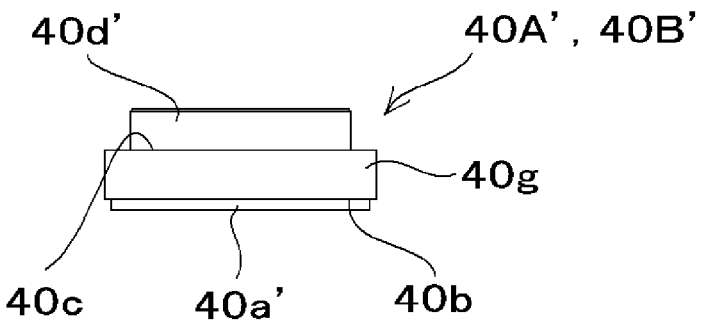
FIGS. 8(a), 8(b), and 8(c) are a front view, a cut front view, and a perspective view of a bearing bush in the rotary electric machine of FIG. 7.
Figure 8:
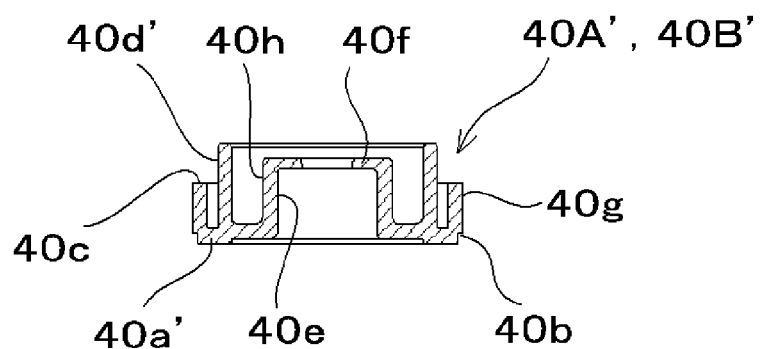
Figure 8:
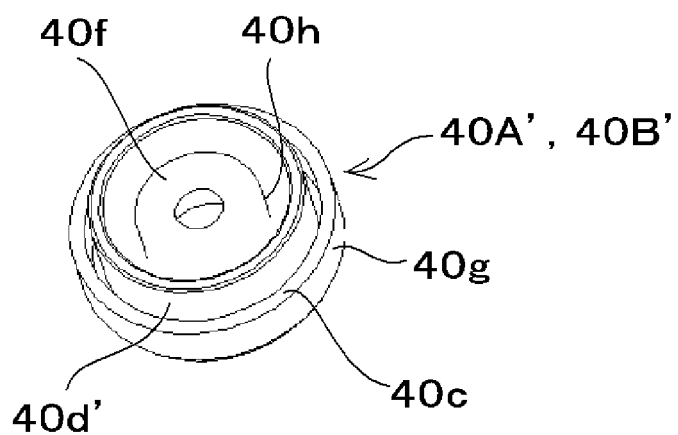

First, the second preferred embodiment of the present invention is now described referring to FIGS. 7 and 8. The second preferred embodiment preferably uses bearing bushes 40A' and 40B' which are different from the bearing bushes 40A and 40B of the first preferred embodiment. In the following description, the same reference signs as those in the first preferred embodiment are used for the same or similar components as/to those in the first preferred embodiment.

The bearing bushes 40A' and 40B' in this preferred embodiment are preferably molded of resin such as PPS. The amount of the resin material is set to be optimum. The bearing bushes 40A' and 40B' have the structure shown in FIGS. 8(a) to 8(c). More specifically, each of the bearing bushes 40A' and 40B' preferably includes an annular base portion 40a' as a main body having an outer diameter approximately equal to the inner diameter of the teeth 12c of the main poles 12b of the stator core 12; a fitted portion 40b which has a step and is arranged on the outer circumference of the base portion 40a'; a substantially cylindrical attachment support cylinder 40g which extends upward from the fitted portion 40b and includes a cover support surface 40c on its end surface; a substantially cylindrical spigot portion 40d' arranged on the upper surface of the base portion 40a' inside the attachment support cylinder 40g to be coaxial with the attachment support cylinder 40g; a bearing holding cylinder 40h which is arranged on the inner peripheral portion of the upper surface of the base portion 40a' to extend upward therefrom and includes a bearing holding surface 40e on its inner circumference; and a cover portion 40f extending from the upper end of the bearing holding cylinder 40h to the inside.

Returning to FIG. 7, the metal bearings 42A and 42B are fixed to the bearing holding surfaces 40e of the bearing bushes 40A' and 40B' by, for example, press-fitting, respectively. The bearing bushes 40A' and 40B' are attached to the stator core 12 from both sides thereof in the axial direction, while the base portions 40a' face each other. More specifically, the fitted portion 40b of each of the bearing bushes 40A' and 40B' is fitted to the inside of the teeth 12c of the main poles 12b of the stator core 12, and the stepped surface of each fitted portion 40b is brought into contact with the corresponding end surface of the stator core 12. In this manner, the bearing bushes 40A' and 40B' are attached to the stator core 12, the axial centers of the bearing bushes 40A' and 40B' are aligned by fitting the fitted portions 40b, and the axial positions of the bearing bush 40A' and 40B' are retained by the stepped surfaces.

The lower bearing bush 40B' is fixed to the stator core 12 by fixing the lower cover 32 to the stator core 12. The upper end surface of the inner frame 32c of the lower cover 32 is in contact with the attachment support surface 40c of the bearing bush 40B'. When the lower cover 32 is fixed to the stator 10, the bearing bush 40B' having a portion fitted into and held by the stator core 12 is sandwiched between the stator core 12 and the lower cover 32, thereby firmly fixed.

In addition, when the upper cover 30 is fixed to the stator core 12, the top plate 30a of the upper cover 30 comes into contact with the attachment support surface 40c of the bearing bush 40A' and the bearing bush 40A' is sandwiched between the stator core 12 and the upper cover 30. Thus, the bearing bush 40A' is surely fixed. In this state, the spigot portion 40d' of the bearing bush 40A' is freely inserted through the opening 30c of the top plate 30a of the upper cover 30 and the opening 34a of the attachment plate 34, and the top end of the spigot portion 40d' projects from the upper surface of the attachment plate 34. With use of this projecting portion of the spigot portion 40d', the rotor shaft 22 can be aligned with an input portion of another device precisely when the motor of this preferred embodiment is mounted in that device.

Figure 9:
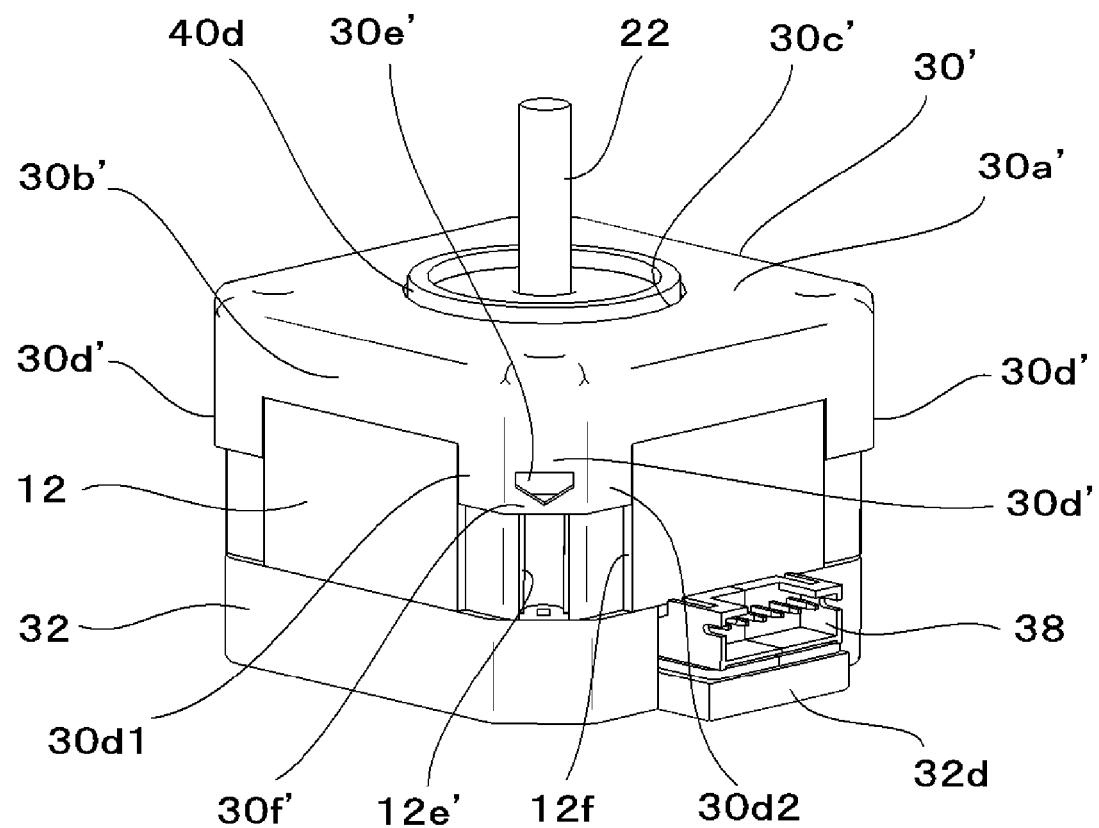
FIG. 9 is a perspective view of a rotary electric machine according to the third preferred embodiment of the present invention.
Figure 10:
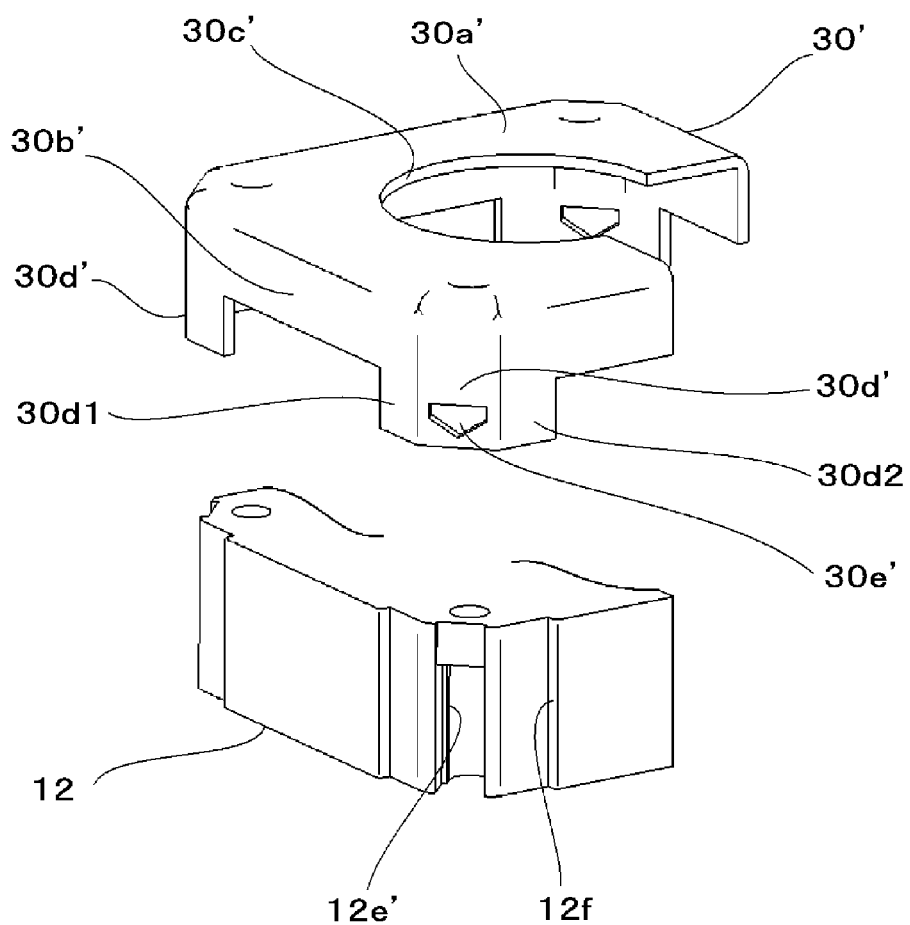
FIG. 10 is a partially exploded perspective view of a portion of the rotary electric machine of FIG. 9, including a stator core and a motor cover.

Next, the third preferred embodiment of the present invention is described referring to FIGS. 9 and 10. In the following description, the same reference signs as those in the above-described preferred embodiments are used for the same or similar components as/to those in the above-described preferred embodiments.

Referring to FIGS. 9 and 10, an upper cover 30', preferably formed by, for example, pressing a thin metal plate, has a top plate 30a' and an approximately square outer frame 30b'. The top plate 30a' is provided with an opening 30c' at its center. The opening 30c' has an inner diameter approximately equal to the inner diameter of the inner frame of the lower cover 32. The approximately square outer frame 30b' is provided with a fixing piece 30d' at every corner. The fixing portion 30d' is integrally provided with other portions of the outer frame 30b' and extends downward. Each fixing piece 30d' is arranged to correspond to the chamfered portion of the corner of the stator core 12. In this preferred embodiment, side portions 30d1 and 30d2 are provided on both side of a portion (referred to as a center portion) corresponding to the chamfered portion of the stator core 12. The center portion and the side portions 30d1 and 30d2 of the fixing piece 30d' are continuous and provided as a single portion. The side portions 30d1 and 30d2 are parallel or substantially parallel to two sides of the stator core 12. The side portions 30d1 and 30d2 can prevent the upper cover 30d' from rotating with respect to the stator core 12 and also will also preferably function as a reinforcement portion to resist deformation caused by crimping. Each fixing piece 30d' preferably has a hole 30e' and a crimping portion 30f' in the center portion. The hole 30e' is provided at a lower position and the crimping portion 30f' is located lower than the hole 30e'. On the inner lower edge of the hole 30e', two tapered surfaces are provided such that the center of the inner lower edge is the lowest, i.e., the tapered surfaces are provided with a V-shape, as in the first preferred embodiment.

The stator core 12 is provided with a concave portion 12e' at a position corresponding to the lower portion of the fixing piece 30d'. The concave portion 12e' is open on the outer surface of the stator core 12. The upper edge of the concave portion 12e' is arranged at such a level that it partly crosses the tapered surfaces of the hole 30e' of the fixing piece 30d' when the lower end surface of the outer frame 30b' of the upper cover 30' is in contact with the upper surface of the stator core 12. The concave portion 12e' is preferably defined continuously from its upper edge position to the position of the lower edge of the stator core 12. Moreover, a stepped groove 12f extending in the axial direction is defined on the circumferential surface of the stator core 12 from each corners of the square stator core 12 to portions below the side portions 30d1 and 30d2 of the fixing piece 30d'. Each fixing piece 30d' of the upper cover 30' is preferably arranged to be fitted into the upper portions of the stepped grooves 12f in the assembly process. The side portions 30d1 and 30d2 of the fixing piece 30d' are arranged to be flush with four side surfaces of the stator core 12 when the upper cover 30' is attached to the stator core 12.

In this preferred embodiment, the center of the crimping portion 30f' is deformed by crimping to cause the crimping portion 30f' at least partly enter the concave portion 12e', as in the preferred embodiment shown in FIGS. 1 to 6. In this manner, the upper cover 30' is fixed to the stator core 12 by crimping and the same functions and effects described in the above preferred embodiments can be obtained. Moreover, as the side portions 30d1 and 30d2 which are perpendicular or substantially perpendicular to each other are provided to come into contact with two sides of the stator core 12 which are perpendicular or substantially perpendicular to each other, the upper cover 30' can be reliably prevented from rotating with respect to the stator core 12 and therefore can be tightly fixed to the stator core 12. Especially, the effect of preventing rotation of the upper cover 30' is significant because the stator core 12 is provided with the stepped grooves 12*f* into which the fixing piece 30*d'* is fitted.

Figure 11:
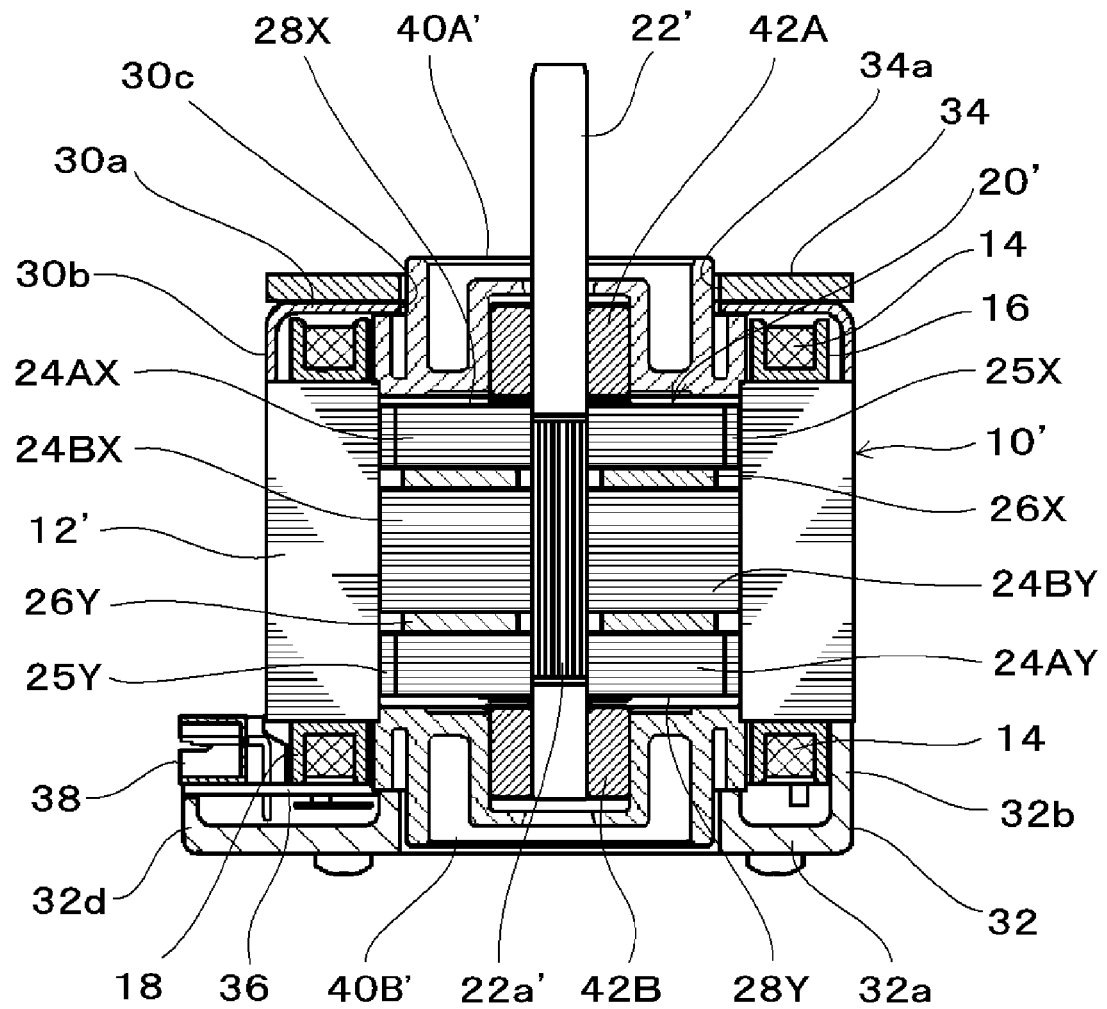
FIG. 11 is a cut front view of a rotary machine according to the fourth preferred embodiment of the present invention.

Next, the fourth preferred embodiment is described referring to FIG. 11. In this preferred embodiment, a so-called twin magnet type rotator 20' and a stator 10' arranged to correspond to the axial length of the rotator 20' are preferably used.

The stator 10' has a different structure from that in the first preferred embodiment shown in FIG. 1. The structure of the stator core 12' is preferably defined by a plurality of laminated silicon steel plates. In this preferred embodiment, the number of the silicon steel plates defining the stator core 12' is increased to obtain a predetermined axial length. Also in this case, the silicon steel plates pressed in a predetermined shape can be laminated with each rotated from adjacent silicon steel plates by 90° as in the first preferred embodiment. In this manner, variations in the permeance vectors can be cancelled, i.e., balanced permeance vectors can be obtained.

The rotor 20' is an HB type rotor using a rotor component in which a permanent magnet is sandwiched between a pair of rotor magnetic poles. In this preferred embodiment, the rotor 20' is defined by two rotor components 28X and 28Y. The rotor 20' includes four disk-shaped rotor magnetic poles 24AX, 24BX, 24BY, and 24AY which are fixed to the rotor shaft 22' side by side in the axial direction, and disk-shaped permanent magnets 26X and 26Y which are arranged between the pair of rotor magnetic poles 24AX and 24BX and between the rotor magnetic poles 24BY and 24AY and are axially magnetized. Each rotor magnetic pole is preferably defined by a plurality of laminated silicon steel plates or the like, and has a plurality of (for example, 22 in this preferred embodiment) magnetic teeth 25X, 25Y arranged equiangularly on its outer circumference.

The pair of rotor magnetic poles 24AX and 24BX are arranged to be offset from each other by ½ tooth pitch. The permanent magnet 26X is arranged between the rotor magnetic poles 24AX and 24BX. Similarly, the pair of rotor magnetic poles 24AY and 24BY are arranged to be offset from each other by ½ tooth pitch. The permanent magnet 26Y is arranged between the rotor magnetic poles 24AY and 24BY. The permanent magnets 26A and 26Y are arranged such that the magnetizing directions thereof are opposite to each other, and the rotor magnetic poles 24AX and 24BX magnetized by the permanent magnet 26X and the rotor magnetic poles 24AY and 24BY magnetized by the permanent magnet 26Y are arranged such that adjacent rotor magnetic poles 24BX and 24BY which face each other have the same polarity. Moreover, the positions of the magnetic teeth of the adjacent rotor magnetic poles 24BX and 24BY in the circumferential direction are the same as each other. The rotor magnetic poles 24AX and 24BX and the permanent magnet 26X define the rotor component 28X, while the rotor magnetic poles 24AY and 24BY and the permanent magnet 26Y define the rotor component 28Y. Although FIG. 11 shows the rotor components 28X and 28Y which are adjacent to each other without a gap therebetween, the rotor components 28X and 28Y may be adjacent to each other with a small gap therebetween.

The magnetic teeth 25X and 25Y of the rotor magnetic poles 24AX, 24AY, 24BX and 24BY of the rotor components 28X and 28Y face the teeth of the main poles of the stator 10' with air gaps therebetween in the radial direction. The rotor 20', in which the two rotor components 28X and 28Y are held around the rotor shaft 22' which is common to both the rotor components 28X and 28Y, is supported to be freely rotatable at the rotor shaft 22' supported by the metal bearings 42A and 42B of the bearing bushes 40A' and 40B' arranged on both the axial sides of the stator 10'. The bearing bushes 40A' and 40B' are attached to the stator 10' by fixing the upper cover 30 and the lower cover 32 to the stator 10'. The rotor shaft 22' includes a knurled portion 22*a'* in an appropriate region to tightly fix the rotor magnetic poles.

Next, the fifth preferred embodiment of the present invention is described referring to FIGS. 12 to 21. The rotary electric machine of this preferred embodiment is a two-phase hybrid (HB) stepper motor as in the first preferred embodiment of FIGS. 1 to 6 (*b*). In the stepper motor, a stator including eight main poles and an HB type rotor are combined with each other.

The stator 110 includes a stator core 112 including a core back portion 112*a* and eight main poles 112*b*, two phases of windings 114 wound around the respective main poles 112*b*, and upper and lower insulators 116 and 118 interposed between the main poles 112*b* and the windings 114. The core back portion 112*a* has an approximately squared loop-shaped contour. The main poles 112*b* are arranged equiangularly or substantially equiangularly to radially project from the core back portion 112*a* inwardly. Each main pole 112*b* defining the shaft for the windings includes three teeth 112*c* on its distal end. The teeth 112*c* of each main pole 112*b* are equally spaced and arranged symmetrically with respect to the center line of that main pole 112*b*.

Figure 21:
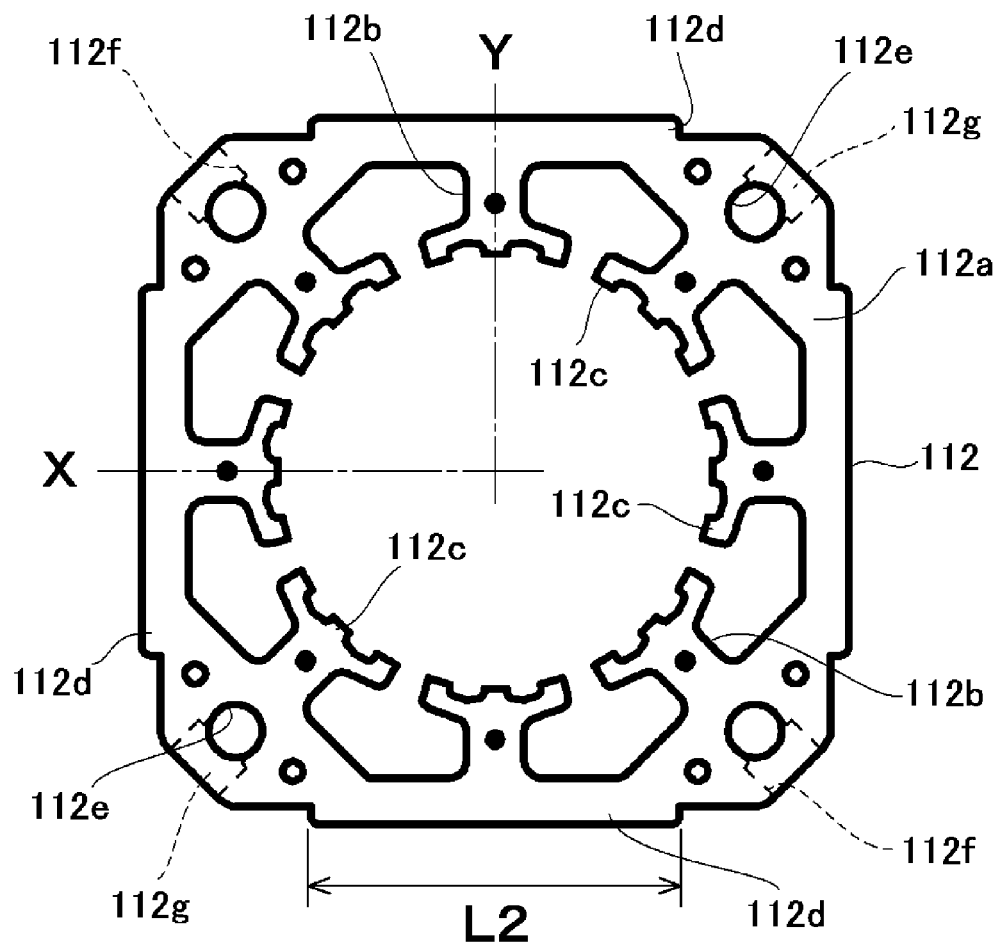
FIG. 21 is a plan view of a stator core in the rotary electric machine of FIG. 12.

The stator core 112 is preferably defined by a plurality of laminated silicon steel plates. Referring to FIG. 21, four main poles 112*b* on the horizontal axis (X-axis) and the vertical axis (Y-axis) intersecting at a right angle, i.e., four main poles 112*b* angularly spaced by 90° from each other are used for the first phase of the two phases (Phases A and C), and the other four main poles 12*b* angularly spaced by a mechanical angle of 90° from each other and each spaced from the adjacent first-phase main pole 112*b* by a mechanical angle of 45° are used for the second phase (Phases B and D). In each of the first and second phases, the four main poles 112*b* are excited to have opposite polarities alternately when a current is supplied.

As is apparent from FIG. 21, in each of the silicon steel plates defining the stator core 112, the square core back portion 112*a* has stepped sides each projecting outward from the outer surface of the corners. When the silicon steel plates having such stepped surfaces are laminated, an expanding portion 112*d* is arranged on each side of the stator core 112, projecting outward from the outer surface of the corners. The expanding portions 112*d* define portions of the outer surface of the motor. Moreover, the stator core 112 includes two types of silicon steel plates which are different from each other in the shape of a hole provided at every corner. As shown in FIG. 21, the first type silicon steel plate preferably includes circular holes 112*e* respectively provided at four corners, and the second type silicon steel plate preferably includes both the circular holes 112*e* and cut portions 112*f* at the corners. The cut portions 112*f* are openings of the circular holes 112*e*, provided on the radially outer circumference of the circular hole 112*e*. In this preferred embodiment, the stator core 112 is defined by a series of groupings of three laminations, i.e., an upper lamination of the first type of silicon steel plates, an intermediate lamination of the second type of silicon steel plates, and a lower lamination of the first type of silicon steel plates. Thus, on the outer circumference of every corner of the stator core 112, a concave portion 112g opening toward the outside in the radial direction is arranged in the intermediate lamination. The circular holes 112e in the upper lamination and the lower lamination are connected to the concave portions 112g.

Figure 13:
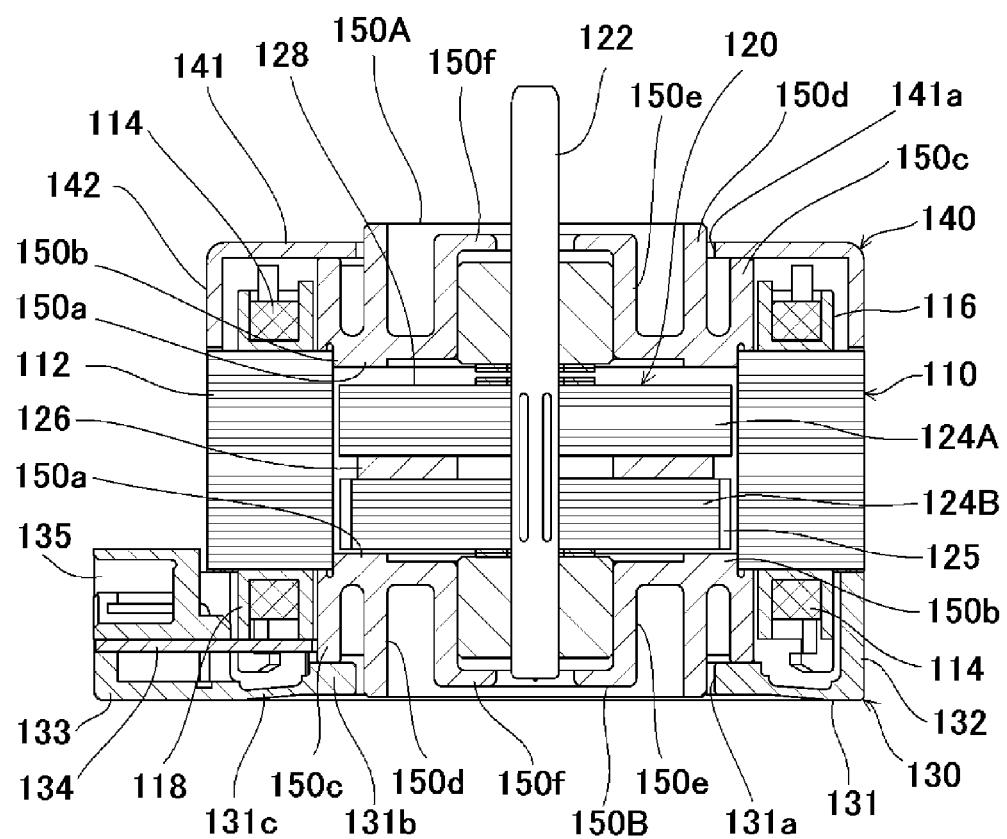
FIG. 13 is a cut front view of the rotary electric machine of FIG. 12.

Referring to FIG. 13, the rotor 120 arranged inside the stator core 112 includes two rotor magnetic poles 124A and 124B axially arranged alongside each other and fixed to the rotor shaft 122, and a disk-shaped permanent magnet 126 interposed between the rotor magnetic poles 124A and 124B and axially magnetized. Each of the rotor magnetic poles 124A and 124B is defined by a plurality of laminated silicon steel plates or the like and has a plurality of magnetic teeth 125 on its outer circumference which are spaced equiangularly. In this example, each magnetic pole 124A, 124B preferably has 22 teeth. The magnetic poles 124A and 124B are offset by ½ tooth pitch with respect to each other. The pair of rotor magnetic poles 124A and 124B and the permanent magnet 126 arranged therebetween together define a rotor component 128. The permanent magnet 126 is preferably made of a ferrite magnet, for example, but can be made of other magnetic material, e.g., a rare earth magnet such as Neodymium magnet.

The number of the magnetic teeth 125 of each rotor magnetic pole 124A, 124B is preferably 22, for example. Thus, the pitch of the magnetic teeth 125 is 360°/22=16.36°. The step angle is obtained by dividing the pitch of the magnetic teeth 125 by four, i.e., 4.09°, because the stepper motor of this example is a two-phase motor. More specifically, in the stepper motor of this example is an HB type motor, when one rotor magnetic pole 124A is magnetized to S-pole, the magnetic tooth 125 of the other rotor magnetic pole 124B of N-pole is arranged between every adjacent two S-pole magnetic teeth 125 with an axial space corresponding to the thickness of the permanent magnet 126. Therefore, the N-pole pitch and the S-pole pitch of the magnetic teeth 125 in the rotor component 128 is 8.18°, and the step angle obtained by dividing this value by the number of the phases is 4.09° as described above, because the number of the phases is two in this preferred embodiment.

Figure 12:
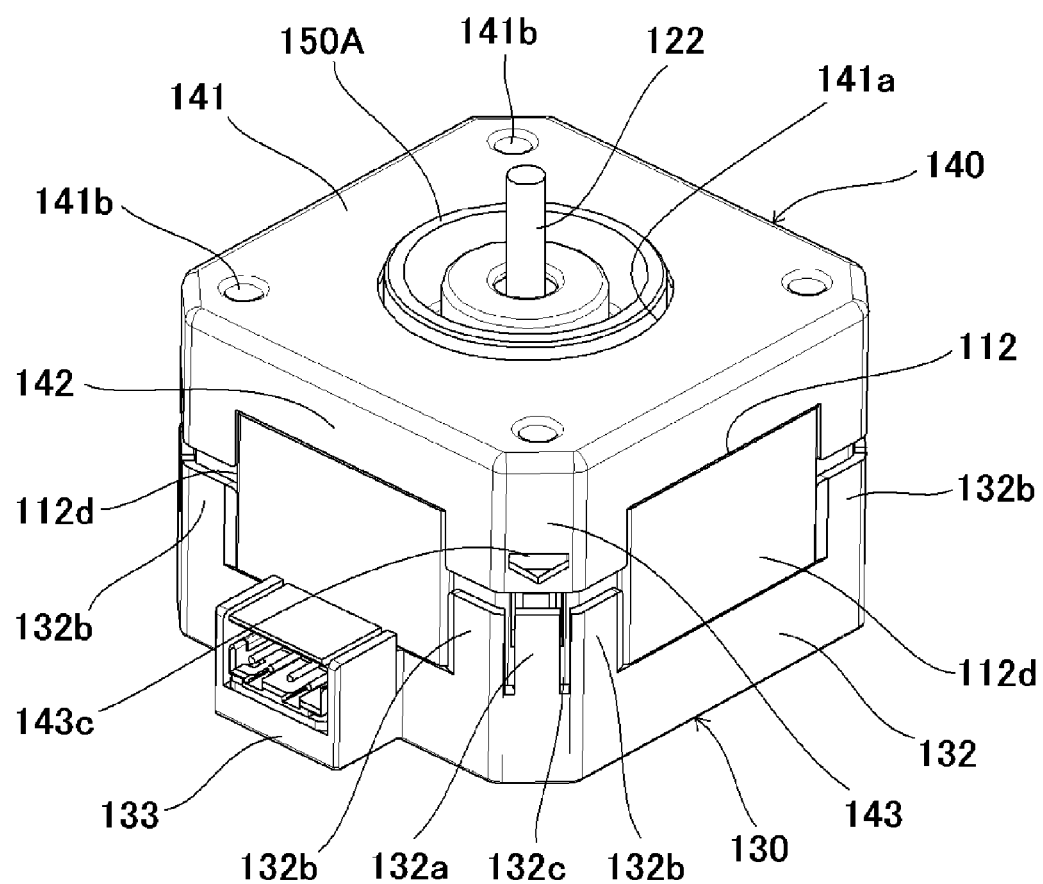
FIG. 12 is a perspective view of a rotary machine according to the fifth preferred embodiment of the present invention.
Figure 14:
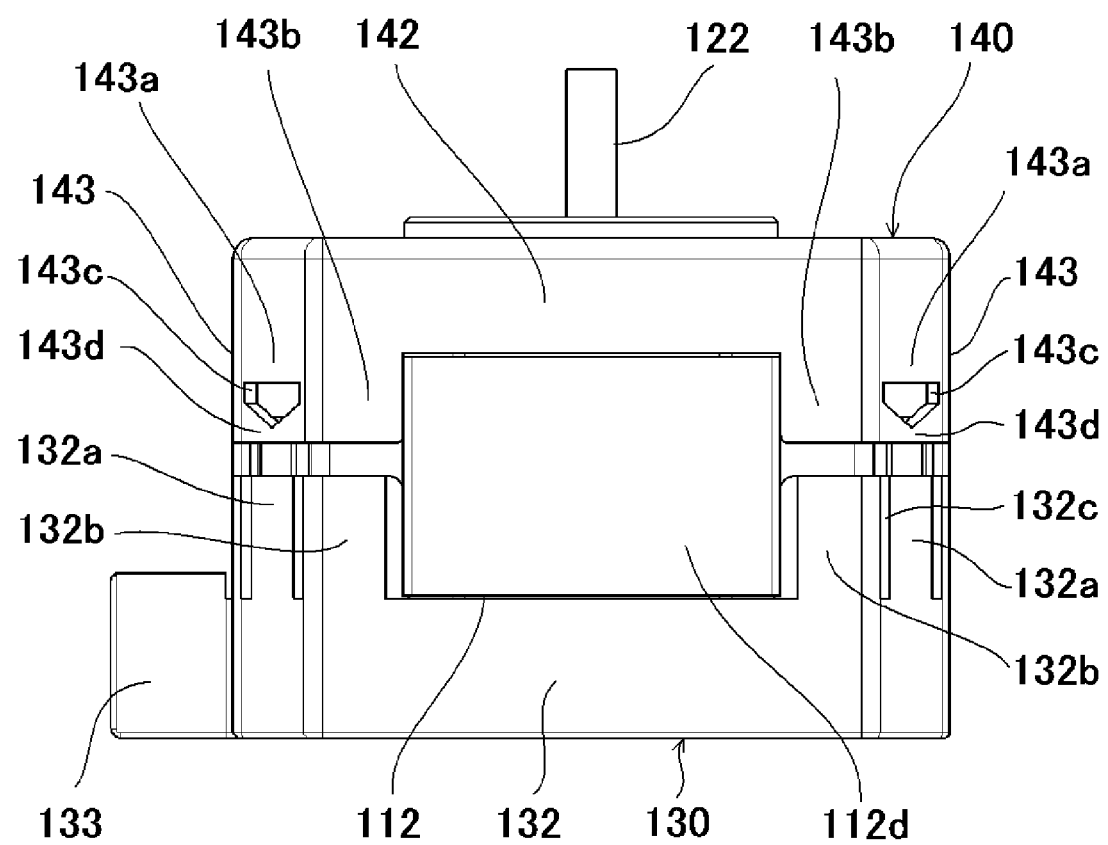
FIG. 14 is a front view of the rotary electric machine of FIG. 12.

Referring to FIGS. 12 to 14, covers 130 and 140 are arranged on both sides of the stator 110 in the axial direction. For the sake of convenience, the covers 130 and 140 are referred to as a lower cover 130 and an upper cover 140. The lower and upper covers 130 and 140 define a motor outer casing together with the outer surface of the stator core 112 of the stator 110. Each cover 130, 140 preferably has an approximately square contour similar to the stator core 112.

The lower cover 130 includes a bottom plate 131 defining the bottom surface, an outer frame 132 in the shape of a rectangular loop, and a connector support portion 133 provided on one side of the outer frame 132 continuously with the outer frame 132, and is preferably integrally molded of resin such as, for example, PPS or PBT. At the center of the bottom plate 131, an opening 131a is provided. A thick annular support portion 131b is arranged around the opening 131a coaxially or substantially coaxially with the rotor shaft 122 to support a bearing holder described later. A thin portion 131c preferably provided in the shape of a flattened cone angled in the axial direction is arranged between the connector support portion 131b and the bottom plate 131. Thus, the annular support portion 131b is placed at an axially inner position with respect to the bottom plate 131 and can be displaced in the axial direction with respect to the bottom plate 131 due to an elasticity present in the thin portion 131c. The lower cover 130 is fixed to the stator core 110 by a fixing arrangement (engaging arrangement) described later, while the end surface of the outer frame 132 is in contact with the lower surface of the stator core 112. In this manner, the lower cover 130 covers the insulator 118 and the windings 114 projecting from the lower surface of the stator core 112.

The connector support portion 133 on one side of the lower cover 130 is arranged to define a connection terminal portion used to create an electrical connection with the outside. As shown in FIGS. 12 and 13, the connector support portion 133 is preferably produced by cutting a portion of the outer frame 132 of the lower cover 130 and extending the periphery of the cut portion to the side together with the bottom plate 131. In the connector support portion 133, a circuit board 134 attached to the insulator 118 arranged below the stator 110 and a connector 135 mounted on the circuit board 134 are accommodated. Ends of the windings 114 are electrically connected to the circuit board 134 by, for example, soldering or the like, thereby being connected to the terminals of the connector 135. Thus, it is possible to supply an electrical current to the windings 114 and to control the amount of current in the windings 114 by supplying a power from an external power supply and signals to the windings 114.

At every corner of the outer frame 132 of the lower cover 130, an auxiliary piece 132a is preferably arranged to assist an engagement portion (described later) in engagement action and side pieces 132b are arranged on both sides of the auxiliary piece 132a parallel or substantially parallel to two sides defining the corner. The auxiliary piece 132a and the side pieces 132b project axially upward from the upper edge of other portions of the outer frame 132. A slit 132c is preferably provided between the auxiliary piece 132a and the adjacent side piece 132b. Thus, at least the auxiliary piece 132a can be elastically displaced outwardly in the radial direction. The auxiliary piece 132a is preferably provided with an auxiliary claw 132d (shown in FIG. 16) arranged to engage with the stator core 112 in the upper portion thereof. The auxiliary claw 132d is provided such that the projection amount is relatively small.

The engagement piece 136 is also provided at every corner of the lower cover 130 inside the outer frame 132. The engagement piece 136 is spaced from the corner of the outer frame 132 at a predetermined distance and extends upward from the bottom plate 131 to an approximately the same height as the auxiliary piece 132a to oppose the auxiliary piece 132a parallel or substantially parallel thereto. The engagement piece 136 has such a width that the engagement piece 136 can be inserted through the circular hole 112e which is provided at every corner of the stator core 112 as described above. On outer side surface of the upper end portion of the engagement piece 136, i.e., on the surface facing the auxiliary piece 132a, an engagement claw 136a is arranged to project outward to a relatively large extent. The engagement piece 136 is arranged to be inserted into the circular hole 112e of the lower lamination of the stator core 112 and engage with the peripheral edge of the circular hole 112e as the step in the concave portion 112g of the intermediate lamination. In this manner, it is possible to prevent separation of the stator core 112 and the lower cover 130 from each other in the axial direction. At the same time, the auxiliary claw 132d of the auxiliary piece 132a engages with the edge (upper edge) of the lower lamination of the stator core 112.

Figure 15:
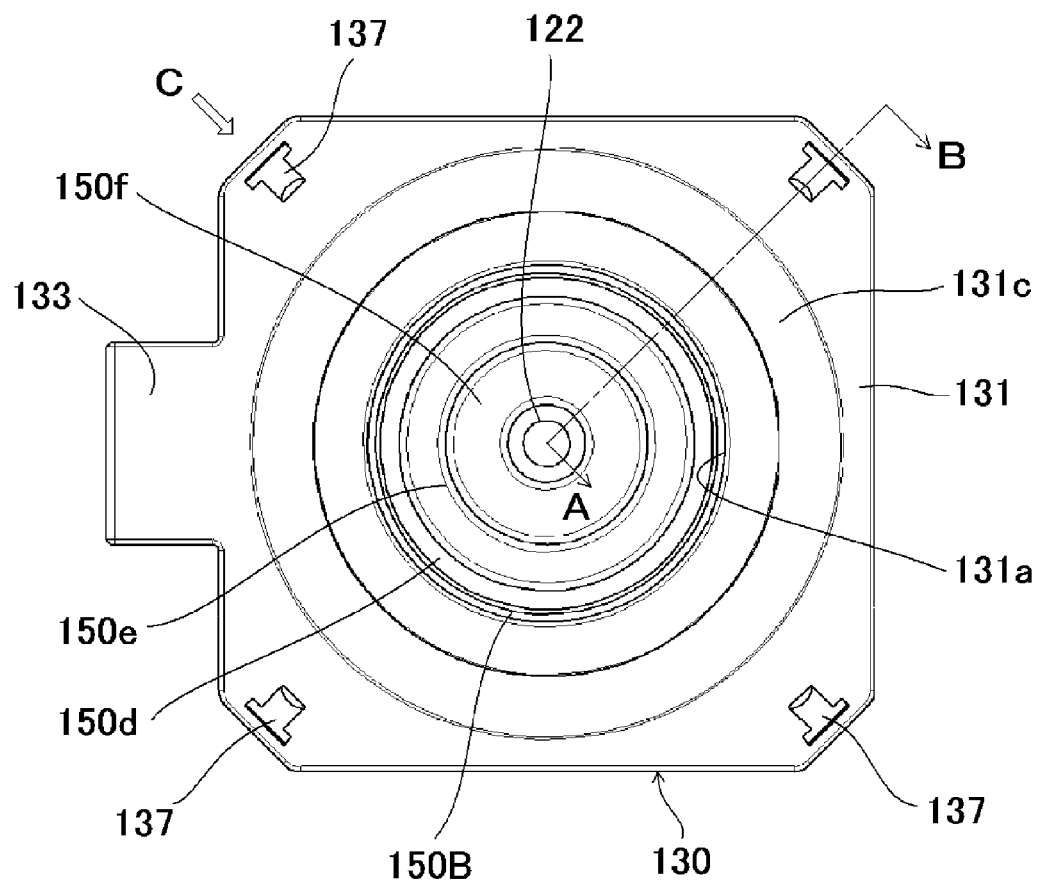
FIG. 15 is a bottom view of the rotary electric machine of FIG. 12.
Figure 16:
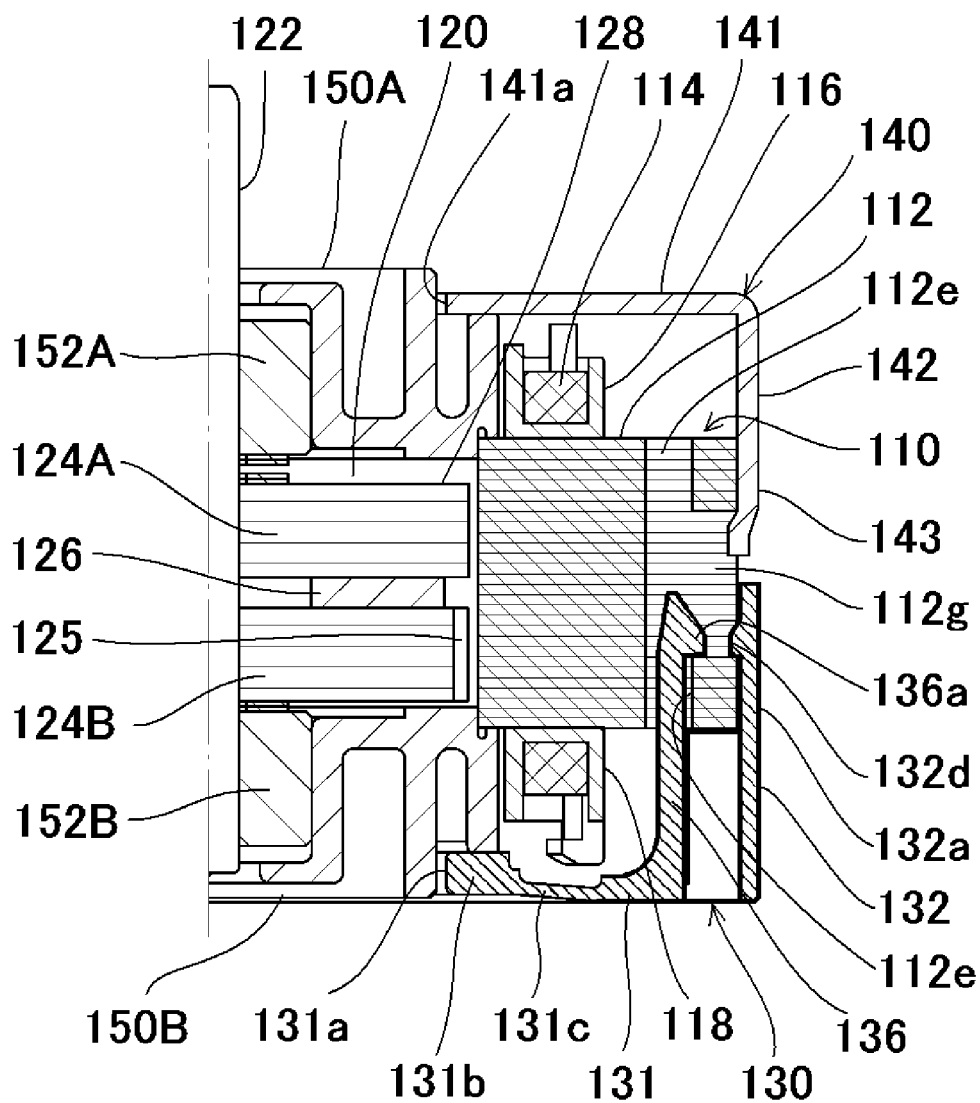
FIG. 16 is a cut front view of the rotary electric machine of FIG. 15, cut along line A-B in FIG. 15.
Figure 17:
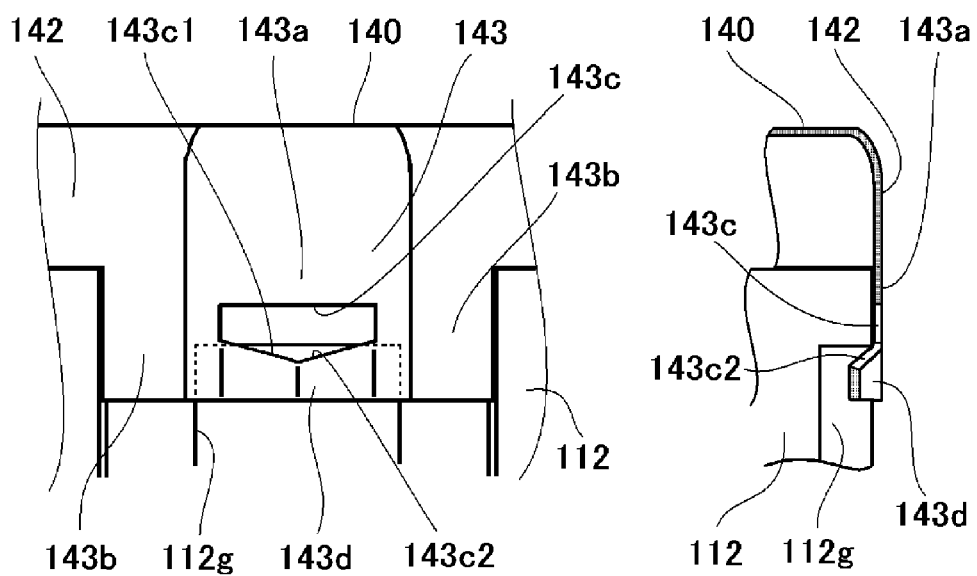
FIGS. 17(a) and 17(b) show one corner of the rotary electric machine of FIG. 12.
Figure 18:
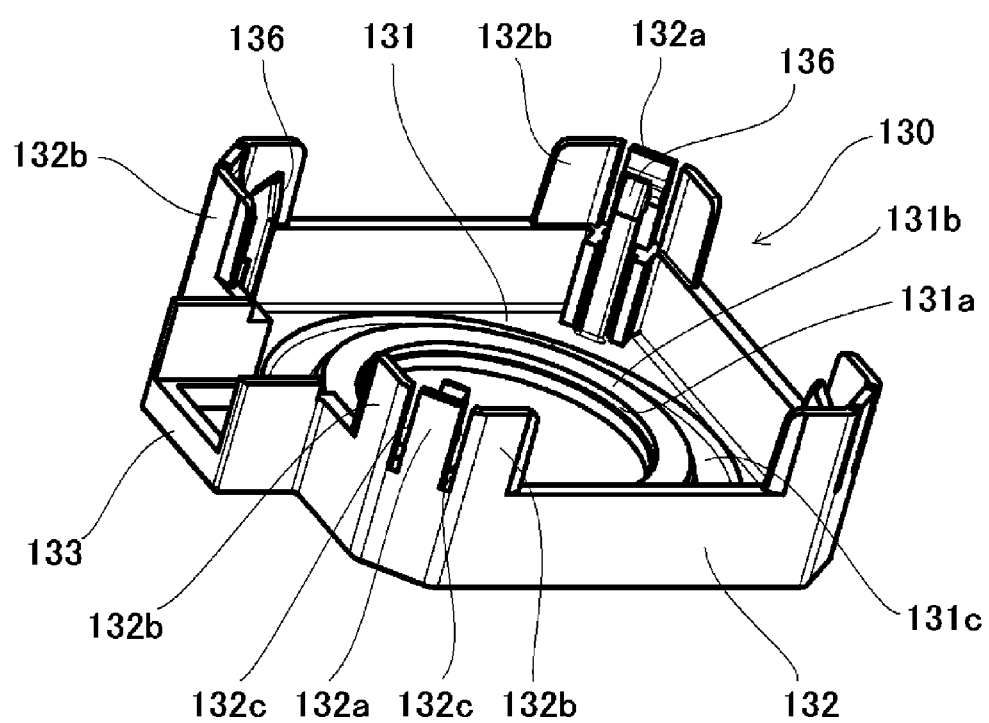
FIG. 18 is a perspective view of a motor cover in the rotary electric machine of FIG. 12.

Because the engagement piece 136 extends from the bottom plate 131 of the lower cover 130, it possesses a substantially long length such that a relatively large amount of elastic deflection can be obtained. Therefore, even if the projection amount of the engagement claw 136a of the engagement piece 136 is increased to make the portion to be engaged (engagement margin) larger, an operability of the engagement is not degraded. On the other hand, the deflection amount of the auxiliary piece 132a extending from the outer frame 132 is smaller and thus the stiffness thereof is ensured. Thus, displacement and distortion of the stator core 112 and the lower cover 130 caused by deflection of the engagement claw 136a can be prevented by the auxiliary piece 132a. The auxiliary piece 132a preferably includes the auxiliary claw 132d in this example, but the auxiliary piece 132a can be arranged not to have the auxiliary claw 132d. In this case, the auxiliary piece 132a and the side pieces 132b can be provided continuously with each other without the slits 132c. Moreover, as shown in FIG. 15, guide holes 137 are arranged at four corners of the bottom plate 131 to correspond to the outer side surfaces of the engagement portions 136. The guide holes 137 are arranged to guide a slide core when the engagement claw 136a and the engagement piece 136 are molded simultaneously.

Figure 19:
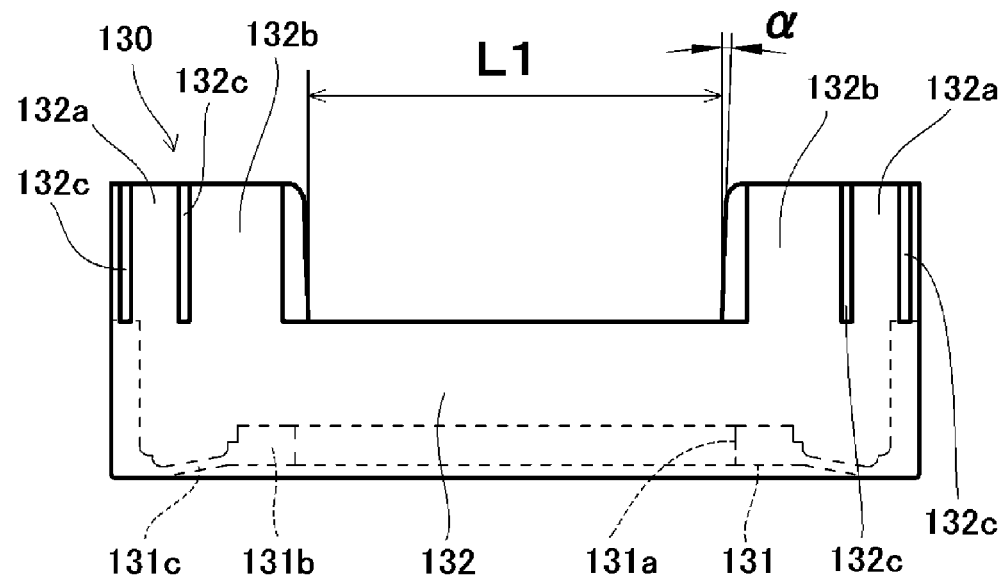
FIG. 19 is a side view of the motor cover of FIG. 18.
Figure 20:
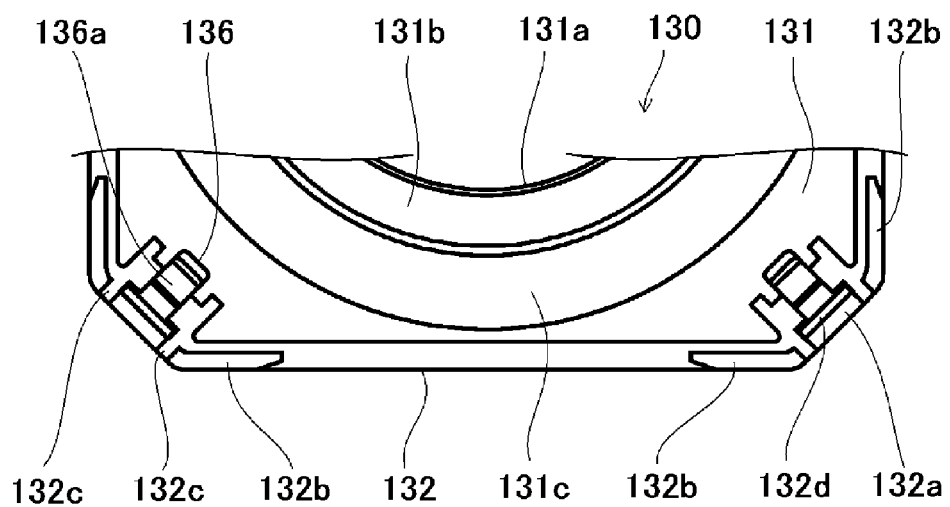
FIG. 20 is a partial plan view of the motor cover of FIG. 18.

As is apparent from FIGS. 12 to 14, the expanding portion 112d of each side of the stator core 112 is placed on the upper end surface of the side of the outer frame 132 of the lower cover 130. That is, the lower cover 130 is arranged to support the stator core 112. The expanding portion 112d of the stator core 112 is interposed between two side pieces 132b of adjacent two corners. As shown in FIGS. 19 and 20, the side edge of the side piece 132b opposite to the auxiliary piece 132a has a thickness being reduced as it extends outward away from the auxiliary piece 132a. Also, the thinned side edge of the auxiliary piece 132a has a slanted portion a such that the space between the side pieces 132d of adjacent two corners becomes larger as it goes upward. On each side of the outer frame 132, the dimension L1 of the space between the side pieces 132b is the smallest at its bottom. The dimension L1 is smaller than the width L2 of the expanding portion 112d of the stator core 112 which is shown in FIG. 21, by several sub-millimeters. Therefore, when the expanding portion 112d of the stator core 112 is fitted into the space between the side pieces 132b on each side of the outer frame 132 to bring the end surface of the expanding portion 112d into contact with the upper edge of the outer frame 132, both sides of the expanding portion 112d scrape and squeeze the side edges of the side pieces 132b. As a result, the expanding portion 112d is fitted between the side pieces 132b while being in close contact therewith, and therefore the stator core 112 is supported by the outer frame 132 substantially without any backlash. Moreover, each engagement piece 136 is caught by a predetermined stepped portion of the stator core 112 in this close-contact state and therefore tight fixing arrangement can be obtained.

Next, the upper cover 140 is described. The upper cover 140 which is arranged to cover the stator core 112 from upward is preferably formed by, for example, pressing a thin metal plate and has a top plate 141 and a rectangular outer frame 142. At the center of the top plate 141, an opening 141a preferably has an inner diameter approximately equal to the inner diameter of the opening 131a of the bottom plate 131 of the lower cover 130. At the corners of the top plate 141, screw holes 141b are arranged to correspond to the circular holes 112e at the corners of the stator core 112, respectively. When the screw holes 141b are provided, burring and/or another process may be carried out. The upper cover 140 is fixed to the stator core 110 by crimping that is described next, while the lower end surface of the outer frame 141 is in contact with the upper surface of the expanding portions 112 of the stator core 112.

At positions of the rectangular outer frame 142, corresponding to four corners thereof, fixing pieces 143 are provided integrally with the outer frame 142 to extend downward. Each fixing piece 143 includes a main portion 143a located at the corner and side portions 143b arranged on both sides of the main portion 143a to provide the sides defining the corner and reinforce the main portion 143a. The fixing piece 143 is arranged to be fitted into the space between the expanding portions 112d at the corner of the stator core 112. The side portions 143b of the fixing pieces 143 can prevent the upper cover 143 from rotating with respect to the stator core 112 and can also work as a reinforcement to resist deformation when crimping is performed. As shown in FIG. 17(a), the fixing piece 143 has a hole 143c in its lower portion. A portion of the fixing piece 143d lower than the hole 143c works as a crimping portion 143d. The inner lower edge of the hole 143c is preferably V-shaped such that the center of the inner lower edge is the lowest, and has two tapered surfaces 143c1 and 143c2. The lower portion of the fixing piece 143 corresponds to the joint of the upper lamination and the intermediate lamination of the stator core 112. The upper edge of the concave portion 112g of the intermediate lamination is arranged to partly cross the tapered surfaces 143c1 and 143c2 of the hole 143c of the main portion 143a of the fixing piece 143, while the lower end surface of the outer frame 142 of the upper cover 140 is in contact with the upper surface of the stator core 112.

The upper cover 140 is fixed to the stator 110 as follows. The upper cover 140 is arranged on the stator core 112 with the lower end surface of the outer frame 142 contact with the upper end surface of the stator core 112, as described above. Then, stamping is performed at the center of the crimping portion 143d of the main portion 143a of the fixing piece 143 located at every corner of the upper cover 149 from the outside to the inside so that a portion of the crimping portion 143d is deformed to enter the concave portion 112g. In this manner, the upper cover 140 is fixed by crimping. The entry of the portion of the crimping portion 143d into the concave portion 112g provides a retaining function for the upper cover 140, i.e., prevents the upper cover 140 from falling off. In the arrangement of this preferred embodiment, the upper cover 140 can be particularly fixed more tightly. More specifically, as is apparent from FIGS. 17(a) and 17(b), the tapered surface 143c1 and 143c2 at the lower edge of the hole 143c of the main portion 143a of the fixing piece 143, i.e., the tapered surfaces of the upper edge of the crimping portion 143d cross the upper edge of the concave portion 112g of the stator core 12. Therefore, when the crimping portion 143d is deformed into the concave portion 112g, a downward tension is generated in the fixing piece 143 as the tapered surfaces of the upper edge of the crimping portion 143d become deeper. Thus, the upper cover 140 can be pressed toward the stator core 112. This pressing force acts at the every corner of the upper cover 140 to tightly fix the whole upper cover 140 onto the stator core 112.

The aforementioned crimping can be performed at a position of the crimping portion which corresponds to an apex of the V-shape of the lower edge of the hole 143c. This position is the most deformable in terms of the strength of the crimping portion 143d. Therefore, crimping can be easily performed and deformation caused by crimping can preferably be symmetrical. In general, it is relatively difficult to manage the magnitude of an applied force and the shape and amount of deformation in crimping. However, the aforementioned shape in this preferred embodiment enables easy crimping and can provide the well-reproducible deformation amount.

On both axial sides of the stator core 112, bearing bushes 150A and 150B are attached to the inner circumferential portion of the stator core 112. The bearing bushes 150A and 150B respectively hold metal bearings 152A and 152B which support the rotor shaft 122 such that the rotor shaft 122 can freely rotate within the stator core 112. The bearing bushes 150A and 150B have the same shape as each other and are preferably molded of resin such as, for example, PPS. Each of the bearing bushes 150A and 150B preferably includes: a substantially annular base portion 150a having the outer diameter equal to or approximately equal to the inner diameter of the teeth 112c of the main poles 112b of the stator core 112; a stepped fitted portion 150b arranged around the base portion 150a; a substantially cylindrical attachment support cylinder 150c which extends from the fitted portion 150b in the axial direction and includes a cover support surface arranged on its end surface; a cylindrical spigot portion 150d provided in the base portion 150a inside the attachment support cylinder 150c coaxially with the attachment support cylinder 150c; a bearing holding cylinder 150e which is arranged in an inner circumferential portion of the base portion 150a to project in the axial direction and includes a bearing holding surface on its inner circumference; and a cover portion 150f extending from the end of the bearing holding cylinder 150e inwardly in the radial direction.

The metal bearings 152A and 152B are preferably press-fitted and fixed to the inside of the bearing holding surfaces of the bearing bushes 150A and 150B, respectively. The bearing bushes 150A and 150B are attached to the stator core 112 from the both axial sides of the stator core 112 with the base portions 150a thereof opposed to each other. More specifically, the fitted portion 150b of each of the bearing bushes 150A and 150B is fitted to the inside of the inner circumferential surface of the teeth 112 of the main poles 112b of the stator core 112, and the step of each fitted portion 150b is brought into contact with the end surface of the stator core 112. In this manner, the bearing bushes 150A and 150B are fixed to the stator core 112. In addition, axial adjustment of the bearing bushes 150A and 150B can be carried out by fitting the fitted portion 150b to the inside of the stator core 112, and the axial positions of the bearing bushes 150A and 150B can be retained by the steps of the fitted portions 150b.

The lower bearing bush 150B is fixed at the same time as fixing the lower cover 132 to the stator core 112. More specifically, after the spigot portion 150d is inserted to be freely fitted into the opening 131a of the bottom plate 131 of the lower cover 130, the cover support surface at the end surface of the attachment support cylinder 150c is brought into contact with the annular support portion 131b. In this state, the lower cover 132 is fixed to the stator core 112. When the lower cover 132 is fixed to the stator core 112 in this state, the bearing bush 150B is also fixed. During those fixing steps, the bearing bush 150B deflects the thin portion 131c by using the elasticity of the thin portion 131c in the shape of an axially angled flattened cone with respect to the annular support portion 131b, and this elastic restoring force causes the engagement claw 136a of the engagement piece 136 to tightly engage with the stator core 112. Therefore, the stator core 112, the lower case 130 and the bearing bush 150B are surely fixed to one another.

When the upper cover 140 is fixed to the stator core 112, the spigot portion 150d of the bearing bush 150A is freely fitted into the opening 141a of the top plate 141 of the upper cover 140, the top plate 141 comes into contact with the cover support surface of the attachment support cylinder 150c, and the bearing bush 150A is sandwiched between the stator core 112 and the upper cover 140. In this state, crimping performed as described above can fix the upper cover 140 to the stator core 112, thereby surely fixing the stator core 112, the upper cover 140 and the bearing bush 150A to one another.

Please note that the spigot portion 150d of the bearing bush 150A projects from the opening 141a of the top plate 141 of the upper cover 140. With use of the projected portion, the rotor shaft 122 can be aligned or substantially aligned with an input portion of another device when the motor of this preferred embodiment is mounted on that device.

Figure 22:
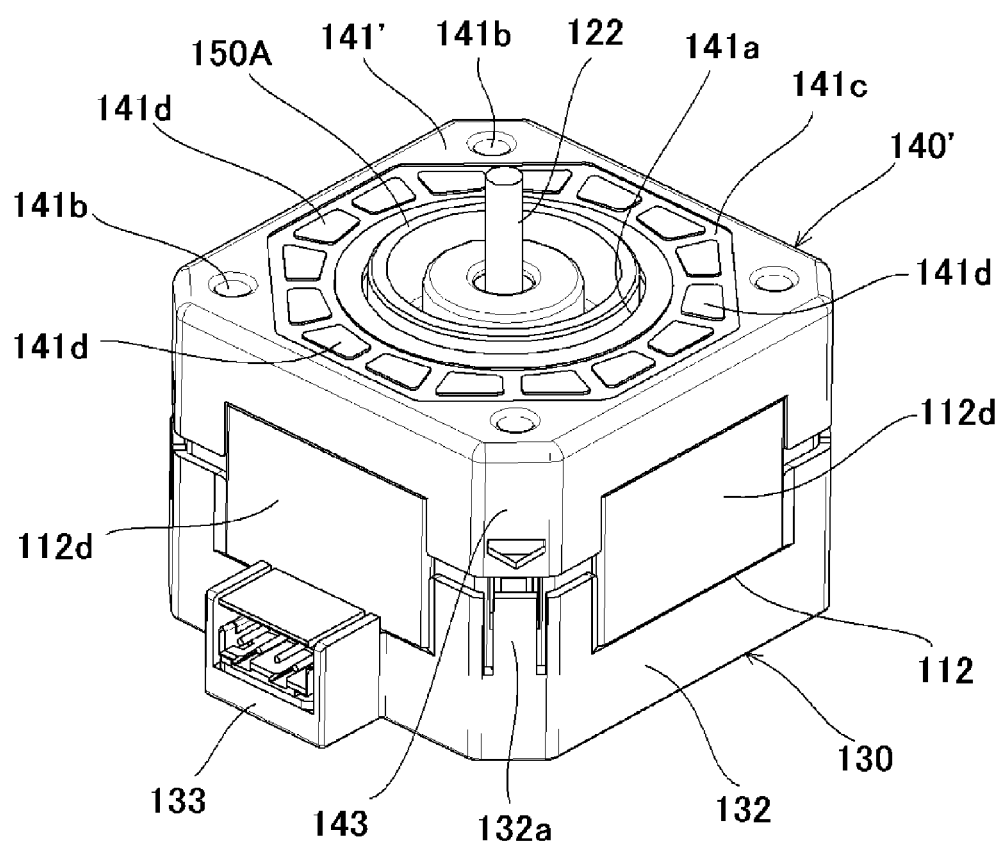
FIG. 22 is a perspective view of a rotary electric machine according to the sixth preferred embodiment of the present invention.
Figure 23:
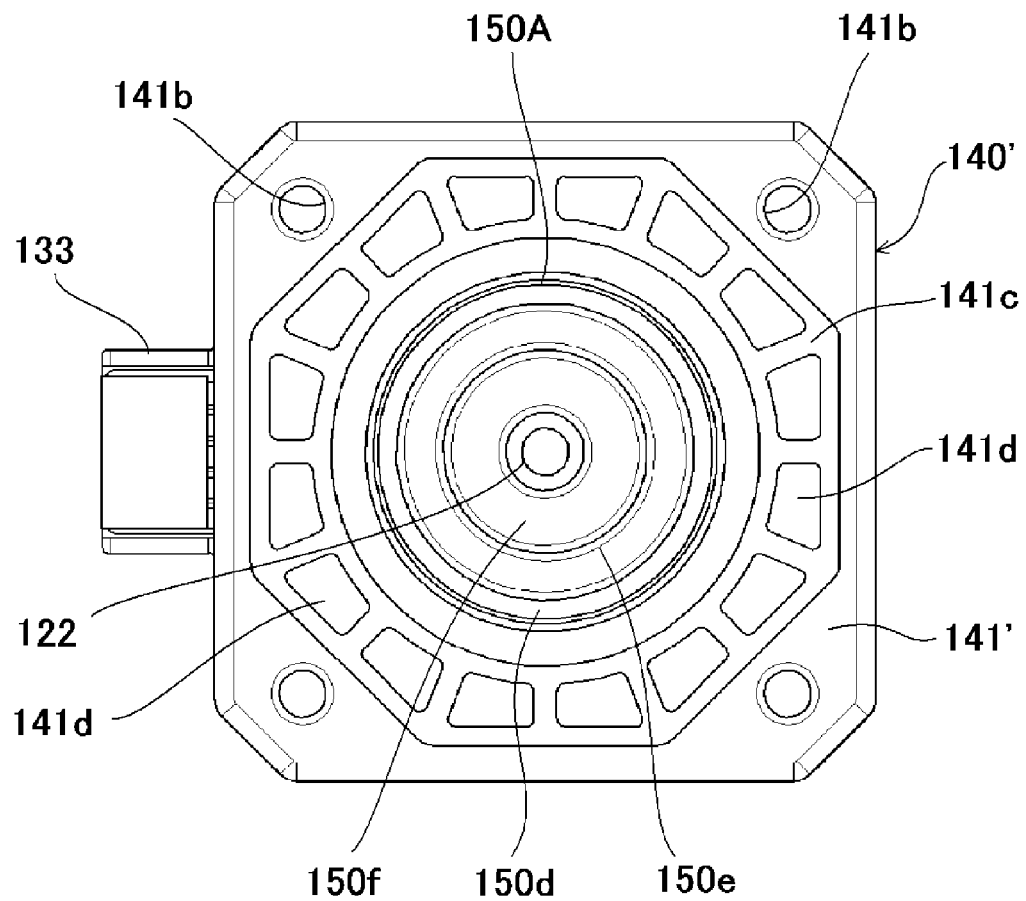
FIG. 23 is a plan view of a rotary electric machine of FIG. 22.

Next, still another preferred embodiment of the present invention is described referring to FIGS. 22 and 23. This preferred embodiment is different from the preferred embodiment of FIGS. 12 to 21 in the shape of the upper cover 140'. More particularly, the top plate 141' of the upper cover 140' is provided with a loop-shaped concave portion 141c. The inner circumferential edge of the concave portion 141c is concentric or substantially concentric with the opening 141a and the outer circumferential edge is in the shape of a regular octagon. In the concave portion 141c, a plurality of convex portions 141d are provided in the circumferential direction. The concave portion 141c and the convex portions 141d are preferably formed at the same time as the upper cover 140' preferably by, for example, pressing a metal plate.

In the upper cover 140' having the aforementioned structure, the strength of the top plate 141' is largely improved. Therefore, when the motor of this preferred embodiment is mounted on another device by using the screw holes 141b or the like of the top plate 141', attachment strength of the motor itself can be ensured and the rotor shaft 122 can be aligned with the input portion of that device precisely.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotary electric machine comprising:
 a stator including:
  a stator core including an approximately loop-shaped core back portion and a plurality of main poles projecting radially inward from the core back portion; and
  two-phase windings arranged around respective ones of the main poles of the stator core, each of the main poles including a plurality of teeth provided on a distal end thereof;
 a rotor including a rotor shaft, the rotor being arranged in a rotatable manner with an air gap provided between the rotor and the stator, and the rotor including:
  a pair of rotor magnetic poles of magnetic material; and
  an axially magnetized permanent magnet arranged between the rotor magnetic poles, each of the rotor magnetic poles including a plurality of magnetic teeth arranged equiangularly on an outer circumferential surface thereof, the rotor magnetic poles being offset from each other by ½ tooth pitch in a circumferential direction; metal bearings arranged to support the rotor shaft of the rotor with respect to the stator; and
 covers arranged on both sides of the stator in an axial direction and bearing holding members attached to the covers to respectively hold the metal bearings; wherein
 a step angle for the rotor is approximately 4.09;
 the bearing holding members are made of molded resin material and each includes:
  a main body;
  a fitted portion having an outer diameter approximately equal to an inner diameter of the main poles of the stator core and arranged to be fitted to the inside of the main poles at an axial end of the stator core;

a stepped surface arranged to be in contact with the axial end of the stator core to define a depth of fitting of the fitted portion to the inside of the main poles;

a substantially cylindrical spigot portion including a projecting end which is arranged to project from a corresponding one of the covers on a motor-output side; and a bearing support surface arranged to support a corresponding one of the bearings;

an outer circumferential surface of the fitted portion, an outer circumferential surface of the spigot portion, and the bearing support surface are concentric or substantially concentric with one another; and the bearing holding members are substantially symmetrically arranged on both axial sides of the stator core.

2. A rotary electric machine according to claim 1, wherein the stator core of the stator includes eight main poles arranged substantially equiangularly in the circumferential direction, the two-phase windings are arranged around the respective main poles, each of the main poles includes three teeth arranged substantially equiangularly and substantially symmetrically with respect to a center line of each respective one of the main poles, and each of the rotor magnetic poles has 22 magnetic teeth such that the rotor has 44 poles.

3. A rotary electric machine according to claim 1, wherein the covers, the bearing holding members attached to the covers, and the metal bearings held by the bearing holding members on both sides of the stator in the axial direction have substantially the same shape, respectively.

4. A rotary electric machine according to claim 1, wherein each of the bearing holding members is provided with a cover portion at an axial end of the bearing support surface that is arranged to cover an end surface of a corresponding one of the metal bearings, the cover portion being integrally provided with the bearing support surface.

5. A rotary electric machine according to claim 1, wherein the distal end of each of the main poles of the stator core includes a plurality of teeth, and each of the bearing holding members being arranged to be supported with its main body fitted into the inner diameter of the teeth of the main poles.

* * * * *